United States Patent
Iwata

(10) Patent No.: US 6,172,621 B1
(45) Date of Patent: Jan. 9, 2001

(54) CODING APPARATUS AND METHOD OF SAME AND DECODING APPARATUS AND METHOD OF SAME

(75) Inventor: Eiji Iwata, Kanagawa (JP)

(73) Assignee: Sony Corporation, Tokyo (JP)

( * ) Notice: Under 35 U.S.C. 154(b), the term of this patent shall be extended for 0 days.

(21) Appl. No.: 09/315,761

(22) Filed: May 20, 1999

(30) Foreign Application Priority Data

Jun. 1, 1998 (JP) .................................... 10-151413

(51) Int. Cl.$^7$ ...................................................... H03M 7/00
(52) U.S. Cl. ................................................................. 341/50
(58) Field of Search ................................ 341/50; 348/714, 348/716, 718

(56) References Cited

U.S. PATENT DOCUMENTS 5,568,278 * 10/1996 Nakano et al. ........................ 358/427
5,646,690 * 7/1997 Yoon ..................................... 348/416
5,828,421 * 10/1998 Boyce et al. .......................... 348/565

* cited by examiner

Primary Examiner—Michael Tokar
Assistant Examiner—Don Phu Le
(74) Attorney, Agent, or Firm—Limbach & Limbach L.L.P.

(57) ABSTRACT

A high speed coding apparatus of digital video data using a parallel processing system, wherein first to third processors are informed of the number of each video segment to be processed and each processor independently starts encoding based on the number of the video segment, namely, sequentially processes the distributed video segment j by blocking to shuffling (VSj-BLK to SFL), motion prediction to quantization (VSj-DCT) to framing (VSj-VLC to FRM) to generate encoded data of a fixed length. A processor finishing the processing with respect to one video segment is given a new video segment to be processed and made to repeat the encoding.

12 Claims, 20 Drawing Sheets

1, 9

TIME

BLOCKING

SHUFFLING

DCT, WEIGHTING, QUANTIZATION, VLC, FRAMING

ENCODING

DECODING

DEFRAMING, VLD, INVERSE QUANTIZATION, INVERSE WEIGHTING, IDCT

DESHUFFLING

DEBLOCKING 1, 9

CODING APPARATUS AND METHOD OF SAME AND DECODING APPARATUS AND METHOD OF SAME

BACKGROUND OF THE INVENTION

1. Field of the Invention

The present invention relates to a coding apparatus for compressing and encoding digital video data and other data at a high speed, suitable for application to for example digital video cassette tape recorders (DVC) for home use, and a method of the same and a decoding apparatus for decoding the compressed and coded data at a high speed and a method of the same.

2. Description of the Related Art

As an example of the coding method and decoding method of images which are now being used, an explanation will be given of the method which has become the standard compression and coding method of moving picture images and which is being applied to home DVCs and other digital video apparatuses.

FIGS. 1A to 1E are views of the flow of encoding and decoding of digital video data.

At the time of encoding, first, as shown in FIG. 1A, the image of one frame to be encoded is divided into processing units referred to as "macroblocks" (MB). This processing is referred to as "blocking".

Next, five macroblocks in one frame are selected according to a predetermined rule and dispersed while changing positions as shown in FIG. 1B to form a video segment. This processing is referred to as "shuffling". The shuffling is carried out so as to make the amount of encoding uniform by dispersing continuous data. Note that the number of video segments in one frame generated by the shuffling becomes one-fifth of the total number of the macroblocks. Note that the algorithm of the shuffling (method of selection of five macroblocks) is determined in advance and does not change at the time of execution due to for example a change of the compression rate.

Next, discrete cosine transform (DCT), weighting, quantization, and variable length coding (VLC) are applied to the formed video segment to encode the five macroblocks (MB0 to MB4) to five compressed data units of fixed length referred to as "sync blocks" as shown in FIG. 1C.

When looking at the compressed data of the individual macroblocks at the time of this encoding, they sometimes cannot be contained in the corresponding sync blocks. This is because, at the time of quantization, the generated amount of encoding is controlled out so that the compressed data of the five macroblocks is contained in five sync blocks as a whole. Therefore, after the variable length decoding (VLD), the compressed data is moved among the five sync blocks. This processing is referred to as a framing.

The framed compressed data is sent to for example a video recording and reproduction apparatus or other recording system.

Next, an explanation will be made of the decoding.

The decoding proceeds by a reverse flow to that of the encoding.

First, the compressed data sent from a video apparatus or other reading system is processed by moving the compressed data among the five sync blocks as mentioned above in order to extract the compressed data of the macroblocks. This processing is referred to as deframing.

Next, the extracted compressed data of each macroblock is subjected to variable length decoding (VLD), inverse quantization, inverse weighting, and inverse discrete cosine transform (IDCT) to decode the video segments as shown in FIG. 1D.

Next, the five macroblocks (MB0 to MB4) comprising each video segment are returned as data of the original position in the frame. Namely, the data of each macroblock is stored at an address of the position of the image in a frame memory etc. This processing is referred to as deshuffling.

Finally, the frame which has been divided to macroblocks is converted to data of a raster scan system as shown in FIG. 1E. This processing is referred to as deblocking.

Then, the deblocked image data is sent to the video input of for example a display.

Next, an explanation will be made of the configuration of the processing apparatus of the related art, the processing algorithm, and the flow of the processing for this encoding and decoding.

First, an explanation will be made of the encoding.

As the coding apparatus for carrying out the encoding as mentioned above, an apparatus having a configuration as shown in FIG. 2 has been used.

A coding apparatus 80 shown in FIG. 2 is configured by a blocking unit 81, a shuffling unit 82, a motion detection unit 83, a DCT unit 84, a classification unit 85, a data amount estimation unit 86, a quantization unit 87, a VLC unit 88, and a framing unit 89 connected as illustrated.

In such a coding apparatus 80, sequentially input video data are divided into macroblocks at the blocking unit 81 which are then used to generate video segments at the shuffling unit 82.

Next, motion is detected at the motion detection unit 83, the coding mode of the DCT to be carried out at the DCT unit 84 is determined, and the DCT is actually carried out at the DCT unit 84. Further, the DCT unit 84 carries out weighting by applying a predetermined filter to the obtained DCT.

Then, the classification unit 85 determines the class number for determining the quantization step, the data amount estimation unit 86 estimates the amount of data based on the class number to determine the quantization step, and the quantization unit 87 carries out the quantization with respect to the DCT result obtained at the DCT unit 84.

The quantized DCT result is subjected to variable length coding at the VLC unit 88 and then subjected to framing at the framing unit 89 to generate sets of five sync blocks, and the generated compressed data is output from the coding apparatus 80.

Further, a processing algorithm in a case where such encoding is carried out by a general purpose processing apparatus using for example a digital signal processor (DSP) is shown in FIG. 3.

As shown in FIG. 3, when the encoding is started by the processing apparatus (step S110), first, blocking is carried out with respect to sequentially input video data to divide it into macroblocks (step S111) and then shuffling is carried out to generate the video segments (step S112).

Next, motion detection is carried out to detect the part having motion and determine the coding mode of the DCT (step S113), DCT is actually carried out and weighting is carried out with respect to the obtained DCT result by applied a predetermined filter (step S114).

Next, the class number for determining the quantization step is determined (step S115), the amount of data is estimated based on the class number to determine the quantization step (step S116), and quantization is carried out with respect to the DCT result obtained at step S114 (step S117).

Next, the quantized DCT result is subjected to variable length coding (step S118) and framing is carried out to generate sets of five sync blocks (step S119).

The processings of step S111 to step S119 are sequentially carried out for one frame's worth of data (step S120) and further repeatedly carried out with respect to sequentially input frames (step S121). When the processing is carried out with respect to all frames to be encoded, the series of encoding is ended (step S122).

A timing chart of the processing in a CPU of the processing apparatus where coding is carried out according to the algorithm shown in FIG. 3 is shown in FIG. 4.

Note that, in FIG. 4, the processings VSj-BLK to SFL indicate processings of blocking (BLK) and shuffling (SFL) with respect to a (j+1)th video segment j (step S111 and step S112 in FIG. 3); the processings VSj-DCT to Q indicate processings from the motion detection to the quantization (Q) with respect to the (j+1)th video segment j (step S113 to step S117 in FIG. 3); and the processings VSj-VLC to FRM indicate processings of variable length coding (VLC) and framing (FRM) with respect to the (j+1)th video segment j (step S118 and step S119 in FIG. 3).

As illustrated, the processing apparatus sequentially carries out the processing steps of the flow chart shown in FIG. 3 for every video segment.

Next, an explanation will be made of the decoding.

As the decoding apparatus for carrying out the decoding as mentioned above, an apparatus having the configuration shown in FIG. 5 has been used.

A decoding apparatus 90 shown in FIG. 5 is configured by a deframing unit 91, a VLD unit 92, an inverse quantization unit 93, an IDCT unit 94, a deshuffling unit 95, and a deblocking unit 96 connected as illustrated.

In a decoding apparatus 90 having such a configuration, compressed data which is encoded by the coding apparatus 80 as shown in for example FIG. 2 and sequentially input is processed by moving the data among the five sync blocks at the defraying unit 91 to restore the data corresponding to the macroblocks, carrying out variable length decoding at the VLD unit 92 with respect to the obtained data for every macroblock, and carrying out inverse quantization at the inverse quantization unit 93.

Next, the inverse quantized DCT result is processed by carrying out inverse DCT at the IDCT unit 94 to transform this to pixel data and by applying a filter reversely weighted to that used at the DCT unit 84 to return it to the data before weighting.

Next, the obtained pixel data is returned to the data of the original pixel position at the deshuffling unit 95 and converted to the data of the raster scan system at the deblocking unit 96 to reproduce the original image data.

The processing algorithm where such decoding is carried out by the general purpose processing apparatus as mentioned above is shown in FIG. 6.

As shown in FIG. 6, when the decoding is started by the processing apparatus (step S130), first, the sequentially input compressed data is processed by moving the data among sync blocks to restore the data corresponding to the macroblocks (step S131) and the obtained data for every macroblock is subjected to variable length decoding (step S132).

Next, inverse quantization is carried out with respect to the variable length decoded data (step S133), the inverse quantized DCT result is subjected to inverse DCT and the result thereof inversely weighted to transform it to the original pixel data (step S134), the result is returned to the data of the original position in the frame by the deshuffling (step S135), and the result further converted to the data of the raster scan system (step S136).

The processings of step S131 to step S136 are sequentially carried out for one frame's worth of data (step S137) and further repeatedly carried out with respect to the sequentially input frames (step S138). Then, when the processing is carried out with respect to all frames to be decoded, the series of decoding is ended (step S139).

A timing chart of the processing in the CPU of the processing apparatus when the decoding is carried out according to the algorithm shown in FIG. 6 is shown in FIG. 7.

Note that, in FIG. 7, the processings VSj-DFR to VLD indicate deframing (DFR) and variable length decoding (VLD) with respect to the (j+1)th video segment j (step S131 and step S132 in FIG. 6); the processings VSj-IQ to IDCT indicate inverse quantization (IQ) and inverse DCT (IDCT) with respect to the (j+1)th video segment j (step S133 and step S134 in FIG. 6); and the processings VSj-DSF to DBL indicate deshuffling (DSF) and deblocking (DBL) with respect to the (j+1)th video segment j (step S135 and step S136 in FIG. 6).

As illustrated, in the processing apparatus, the processing steps of the flow chart shown in FIG. 6 are sequentially carried out for every video segment.

Summarizing the disadvantage to be solved by the invention, there is a demand for higher speed encoding and decoding of image and other data using a parallel processing apparatus having a plurality of processing apparatuses. In the parallel processing apparatuses and parallel processing methods heretofore, however, there have been various disadvantages, so a sufficiently high speed processing could not be achieved.

For example, where the coding and decoding are carried out by the parallel processing, heretofore, the processings of the steps has been distributed among a plurality of processing apparatuses and executed in parallel. In the case of such a parallel processing method, if the execution times of processings in the processing apparatuses are equal, the loads become uniform and very efficient processing can be carried out, but usually the execution times are not become equal. For this reason, the loads of the processing apparatuses become unequal, so highly efficient processing cannot be carried out.

Further, in such a parallel processing method, in the case of for example the above image data, since the processing with respect to one unit of data such as one video segment is carried out divided among a plurality of processing apparatuses, it is necessary to synchronize the apparatuses and control communication accompanying the transfer of data, so there also exists a disadvantage that the configuration of the apparatus and the control method etc. become complex.

Further, the processings to be carried out in the processing apparatuses are different, so it is necessary to prepare processing programs for each individual processing apparatus and separately control the processings for each processing apparatus, so there also exists a disadvantage that the configuration of the apparatus and the control method etc. become further complex.

SUMMARY OF THE INVENTION

An object of the present invention is to provide a coding apparatus and a decoding apparatus having a plurality of processing apparatuses, capable of carrying out encoding and decoding of for example image data at a high speed, and having simple configurations.

Further, another object of the present invention is to provide a coding method and a decoding method which can be applied to a parallel processing apparatus having any configuration and by which encoding and decoding of for example image data can be carried out at a high speed.

In order to achieve the above objects, in the present invention, processing apparatuses share processing covering a plurality of fixed length data using the fixed length data as units of parallel processing and the processing apparatuses operate under the same functions and control.

Therefore, according to a first aspect of the present invention, there is provided a coding apparatus which carries out encoding of different encoding times depending on the content of the element data when encoding for each predetermined number of element data, provided with a dividing means for dividing the data to be encoded having a series of a plurality of element data into a plurality of partial data each having a predetermined number of element data, a plurality of encoding means for encoding the predetermined number of element data of the divided partial data to generate encoded data of a predetermined data length, and distributing means for distributing the plurality of divided partial data among the plurality of encoding means and sequentially distributing next partial data to encoding means finishing the encoding of the distributed partial data.

That is, in a coding apparatus having such a configuration, the dividing means divides the data to be encoded having a series of a plurality of element data into a plurality of partial data each having a predetermined number of element data and sequentially distributes the plurality of divided partial data among a plurality of encoding means. Then, the distributed partial data is encoded in each of the plurality of encoding means based on a predetermined method to generate encoded data having a predetermined data length. At this time, the encoding time differs according to the content of the element data of the distributed partial data. Accordingly, the distributing means sequentially distributes next partial data to the encoding means which finished the encoding with respect to the distributed partial data.

According to a second aspect of the present invention, there is provided a coding method which carries out encoding of different encoding times depending on the content of the element data when encoding for each predetermined number of element data, comprising dividing the data to be encoded having a series of a plurality of element data into a plurality of blocks each having a predetermined number of element data; selecting any predetermined number of blocks from the plurality of divided blocks to form a plurality of partial data having the predetermined number of blocks; sequentially distributing the plurality of formed partial data among a plurality of encoding means; encoding by a predetermined system in each of the plurality of encoding means the element data included in the blocks for each block of partial data distributed to generate encoded data of a predetermined data length for each partial data; further sequentially distributing next partial data to the encoding means finishing the processing on the partial data distributed, and sequentially encoding the plurality of partial data by the plurality of encoding means to generate encoded data of a predetermined data length.

According to a third aspect of the present invention, there is provided a decoding apparatus which decodes encoded data comprised of encoded partial data, comprised of a predetermined number of element data encoded to a predetermined data length, by decoding with different decoding times in accordance with the content of the encoded data, provided with a distributing means for distributing a plurality of the encoded partial data to be decoded to a plurality of decoding means and further sequentially distributing the next encoded partial data to the decoding means finishing the decoding of the distributed encoded partial data, the plurality of decoding means for decoding the distributed encoded partial data to restore the partial data having the predetermined number of element data, and a connecting means for arranging the plurality of element data of the partial data decoded by the plurality of decoding means in a desired order to restore the encoded data.

That is, in a decoding apparatus having such a configuration, the distributing means distributes a plurality of the encoded partial data to be decoded to a plurality of decoding means, and each of the plurality of decoding means decodes the distributed encoded partial data to restore the partial data having the predetermined number of element data. Further, the distributing means further sequentially distributes the next encoded partial data to decoding means finishing the decoding of the distributed encoded partial data. The plurality of element data of the partial data sequentially restored by the plurality of decoding means are then arranged in a desired order to restore the encoded data.

According to a fourth aspect of the present invention, there is provided a decoding method which decodes encoded data comprised of encoded partial data, comprised of a predetermined number of element data encoded to a predetermined data length, by decoding with different decoding times in accordance with the content of the encoded data, comprising distributing a plurality of the encoded partial data to be decoded to a plurality of decoding means; decoding the distributed encoded partial data in the plurality of decoding means to restore the partial data having the predetermined number of element data; sequentially distributing the next encoded partial data to the decoding means finishing the decoding of the distributed encoded partial data; and arranging the plurality of element data of the partial data decoded by the plurality of decoding means in a desired order to restore the encoded data.

BRIEF DESCRIPTION OF THE DRAWINGS

These and other objects and features of the present invention will be more apparent from the following description of the preferred embodiments given with reference to the accompanying drawings, wherein.

DESCRIPTION OF THE PREFERRED EMBODIMENTS

Next, an explanation will be made of a preferred embodiment of the present invention by referring to FIG. 8 to FIG. 20.

In the embodiment, the present invention will be explained by taking as an example an image coding/decoding apparatus suitable for use for example for a digital video tape recorder for the home which carries out parallel processing by a plurality of processors to encode and decode a moving picture.

Note that, as the unit of processing when carrying out parallel processing for the encoding of the digital video data, for example a macroblock, video segment, and frame memory can be considered. When using a macroblock as the unit of parallel processing, however, it becomes necessary to transfer data among macroblocks in the framing, therefore a complex data dependency occurs among macroblocks which becomes a cause of a decline in the performance of the parallel processing. On the other hand, no such data dependency occurs between video segments. Further, there is also no data dependency among frame memories, but use of this is impractical from the viewpoint of the memory capacity when considering an actual coding system. Accordingly, in this embodiment, it is assumed that the processing is carried out using video segments as the unit of parallel processing.

First Image Coding/Decoding Apparatus

First, an explanation will be made of a conventional image coding/decoding apparatus used for encoding and decoding an image as mentioned above by parallel processing.

Figure 1A:
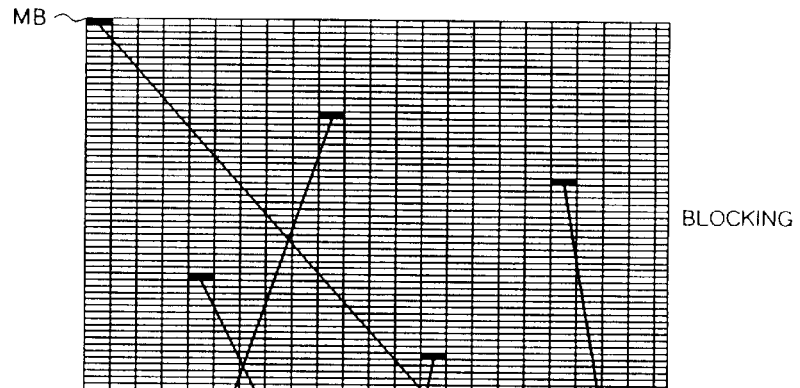
FIGS. 1A to 1E are views for explaining an image coding and decoding method in a home digital video tape recorder.
Figure 1B:
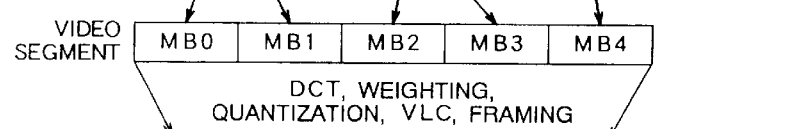
Figure 1C:
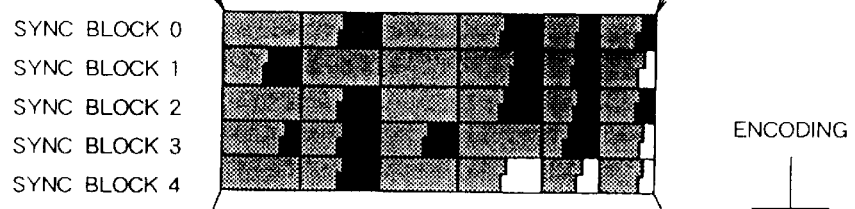
Figure 1D:
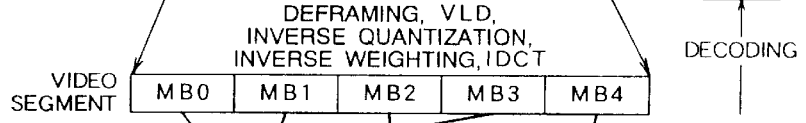
Figure 1E:
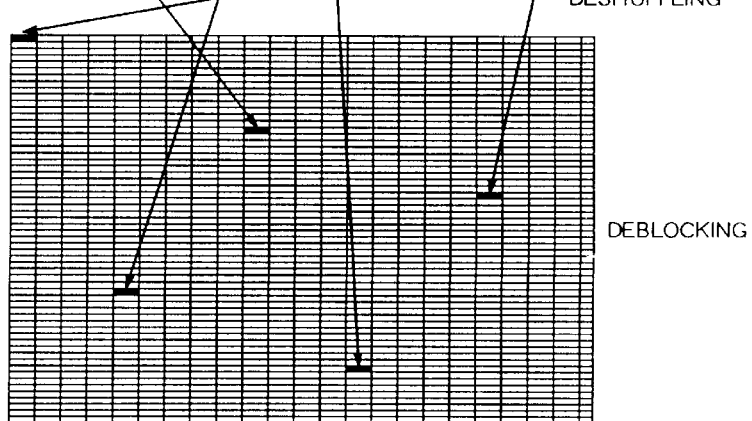
Figure 2:
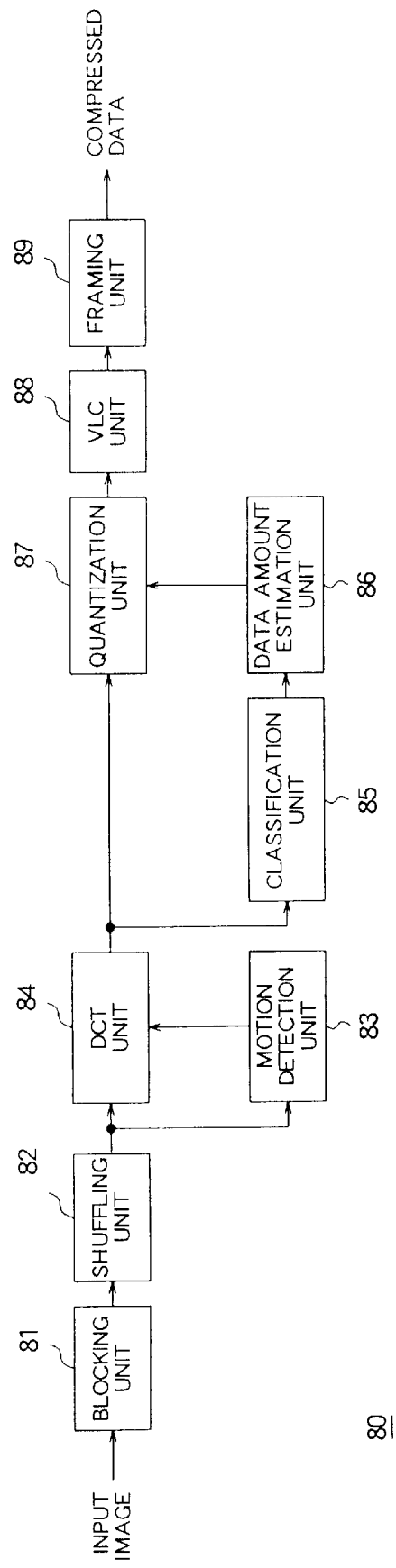
FIG. 2 is a block diagram of the configuration of a coding apparatus of the related art for carrying out the image encoding shown in FIGS. 1A to 1E.
Figure 3:
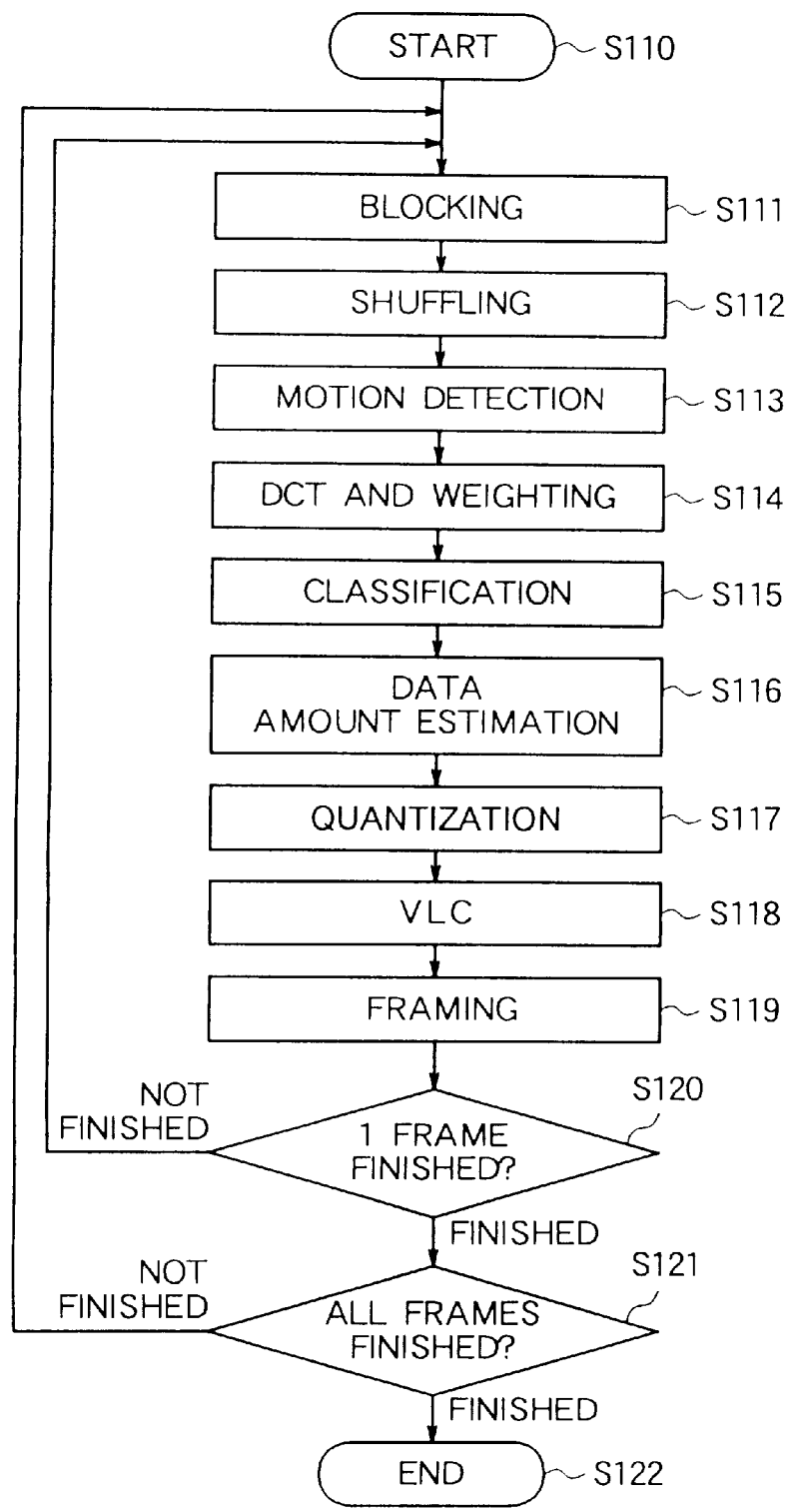
FIG. 3 is a flow chart of the processing in the case where a general purpose processing apparatus encodes the image as shown in FIGS. 1A to 1E.
Figure 4:
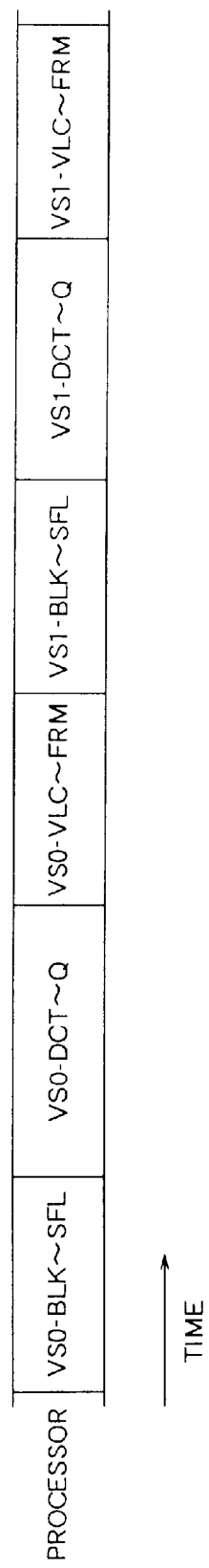
FIG. 4 is a timing chart of the processing state in the case of the image encoding shown in FIG. 3.
Figure 5:
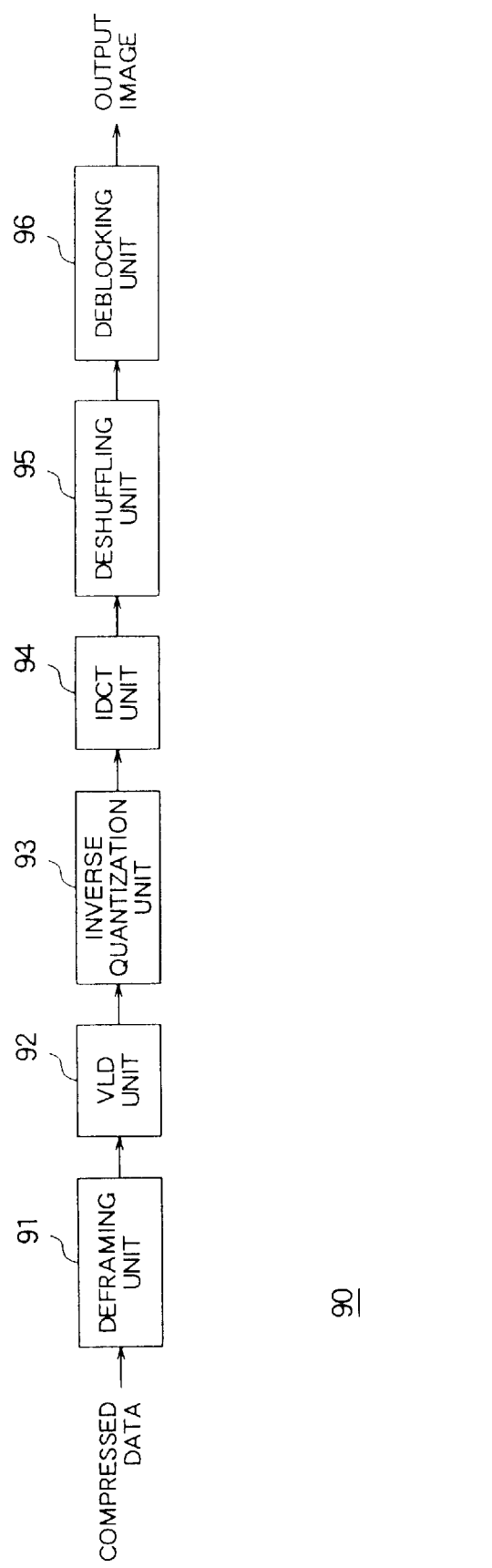
FIG. 5 is a block diagram of the configuration of an image decoding apparatus of the related art for carrying out the image decoding shown in FIGS. 1A to 1E.
Figure 6:
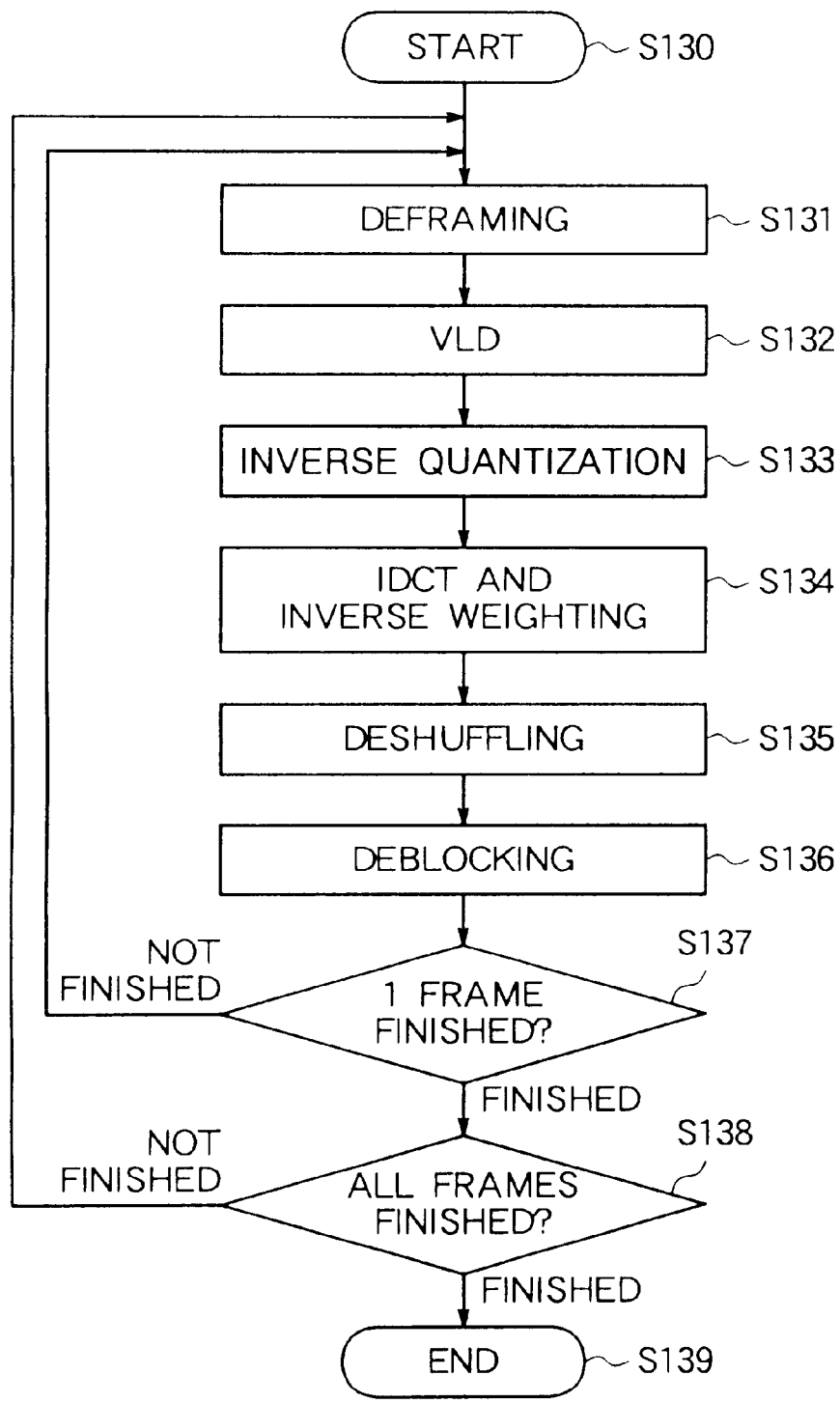
FIG. 6 is a flow chart of the processing in the case where a general purpose processing apparatus decodes the image as shown in FIGS. 1A to 1E.
Figure 7:
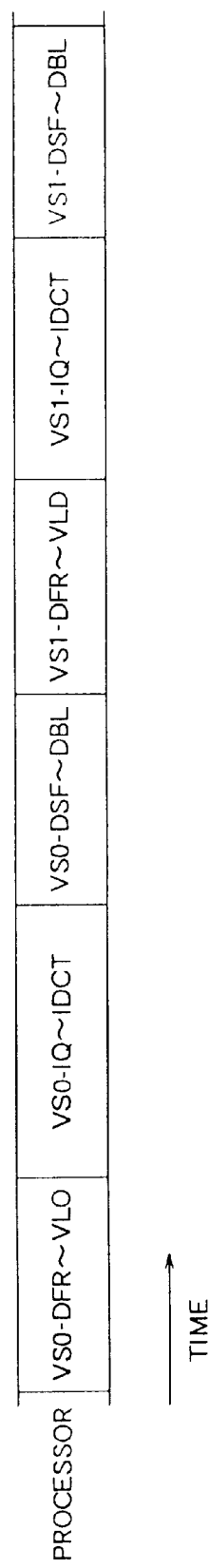
FIG. 7 is a timing chart of the processing state in the case of the image decoding shown in FIG. 6.
Figure 8:
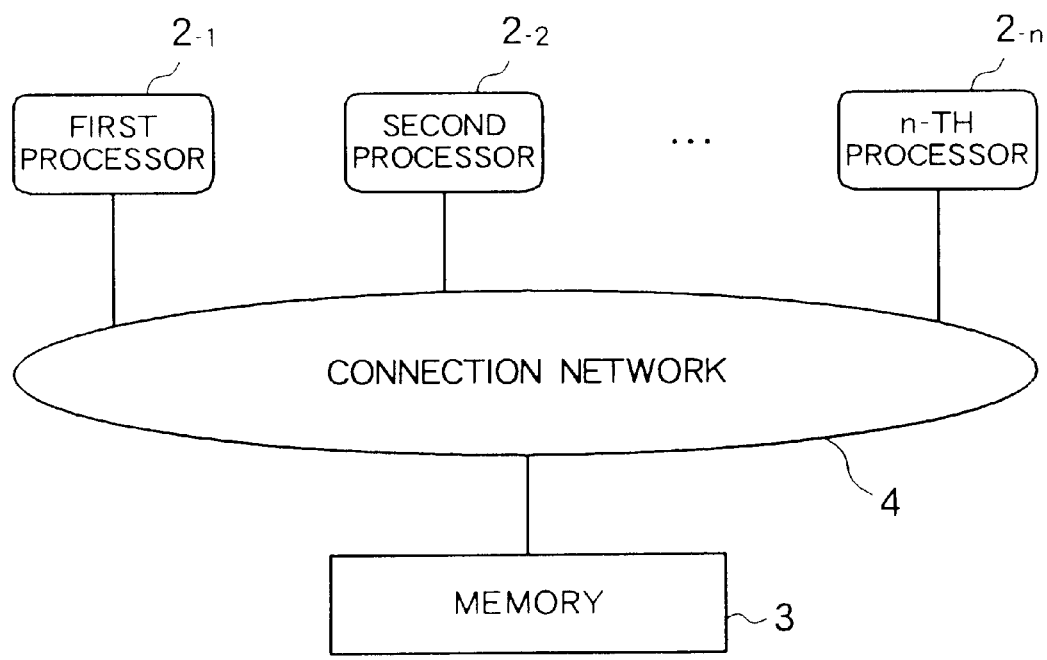
FIG. 8 is a schematic block diagram of the configuration of a parallel processing unit of an image coding/decoding apparatus according to the present invention.

FIG. 8 is a schematic block diagram of the configuration of a parallel processing unit of this image coding/decoding apparatus.

As shown in FIG. 8, a parallel processing unit 9 of the image coding/decoding apparatus has n number of processors $2_{-1}$ to $2_{-n}$, a memory 3, and a connection network 4.

First, an explanation will be made of the configuration of this parallel processing unit 9.

The n number of processors $2_{-1}$ to $2_{-n}$ are processors which independently carry out predetermined processing. Each processor $2_{-i}$ (i=1 to n) has a program ROM or a program RAM in which the processing program to be executed is stored and a RAM for storing the data relating to the processing. The processor $2_{-i}$ carries out a predetermined operation according to the program stored in this program ROM or program RAM in advance.

Note that, in the present embodiment, it is assumed that n=3, that is, the parallel processing unit 9 has three processors $2_{-1}$ to $2_{-3}$.

Further, in the following explanation, a description will be made for the processors $2_{-1}$ to $2_{-n}$ for only the processing concerning the encoding and the decoding of the image data. In parallel with this, however, one processor $2_{-i}$ (i=1 to n) or in each of n number of processors $2_{-1}$ to $2_{-n}$ also carry out processing for controlling the operation of the entire parallel processing unit 9. By this control operation, the processors $2_{-1}$ to $2_{-n}$ operate as explained below in linkage or in synchronization.

The memory 3 is a shared memory of the n number of processors $2_{-1}$ to $2_{-n}$. The memory 3 stores the image data to be processed and the data resulting from processing is has data read from it or written into it suitably by the n number of processors $2_{-1}$ to $2_{-n}$.

The connection network 4 is a connection unit for connecting the n number of processors $2_{-1}$ to $2_{-n}$ and the memory 3 to each other so that the n number of processors $2_{-1}$ to $2_{-n}$ operate in linkage or the n number of processors $2_{-1}$ to $2_{-n}$ appropriately refer to the memory 3.

Next, an explanation will be made of the processing in each processor $2_{-i}$ (i=1 to 3) and the operation of the parallel processing unit 9 in the case where the parallel processing unit 9 having such a configuration carrying out the encoding of a moving picture as explained above.

First, an explanation will be made of the processing in each processor $2_{-i}$.

Figure 9:
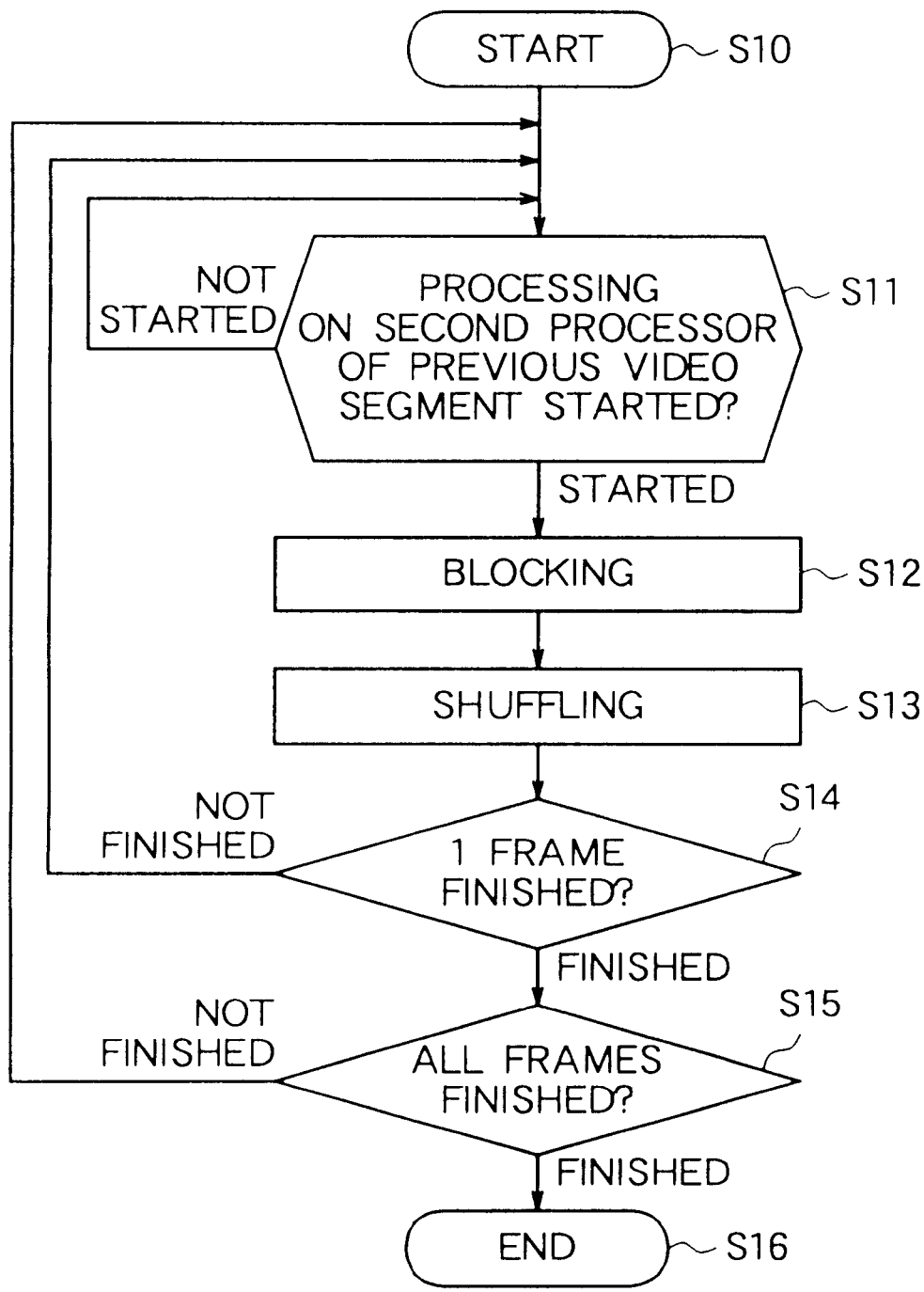
FIG. 9 is a flow chart of the processing in a first processor of the parallel processing unit in the case where the parallel processing unit shown in FIG. 8 encodes an image by a conventional parallel processing method.
Figure 10:
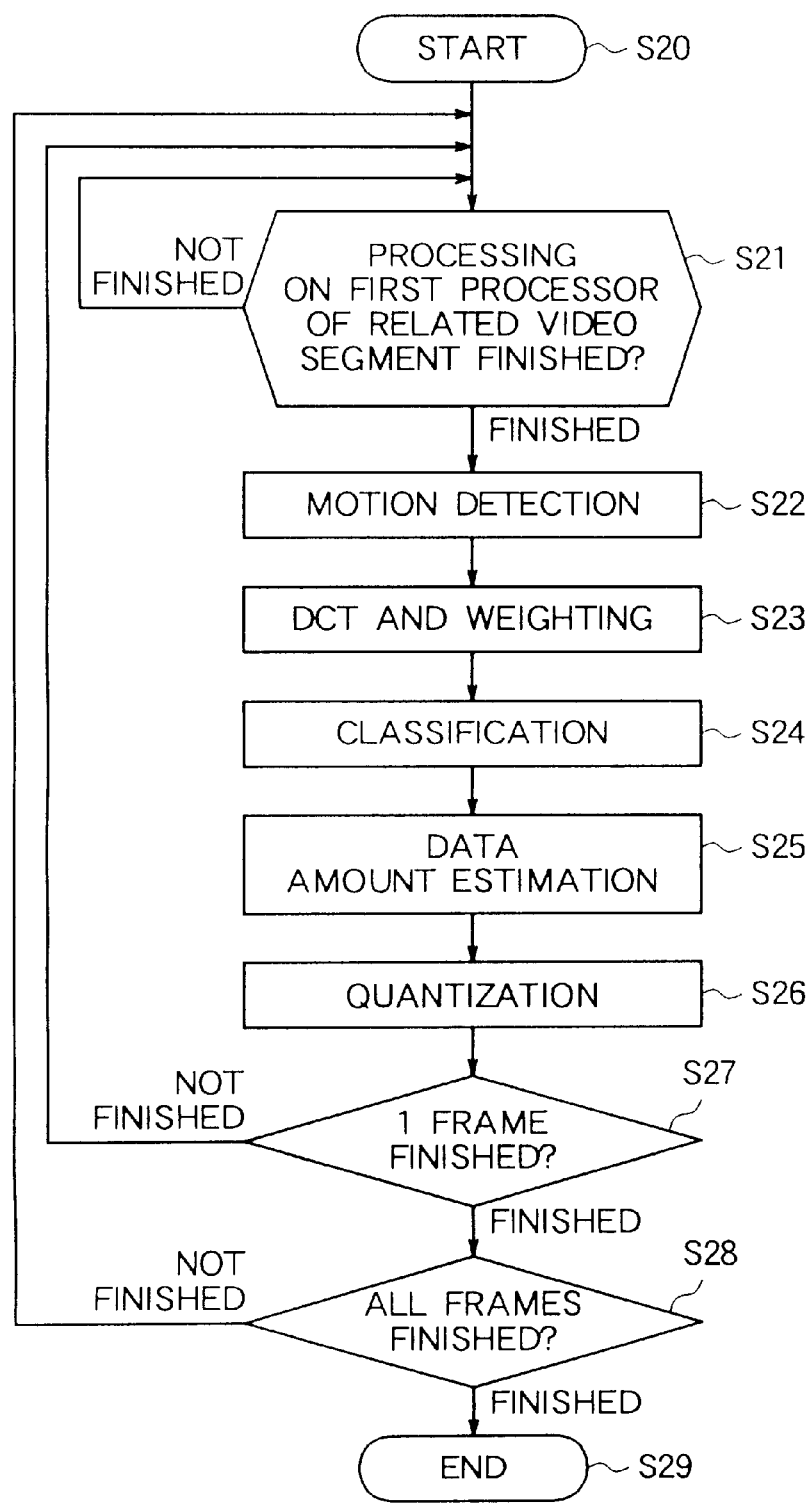
FIG. 10 is a flow chart of the processing in a second processor of the parallel processing unit in the case where the parallel processing unit shown in FIG. 8 encodes an image by a conventional parallel processing method.
Figure 11:
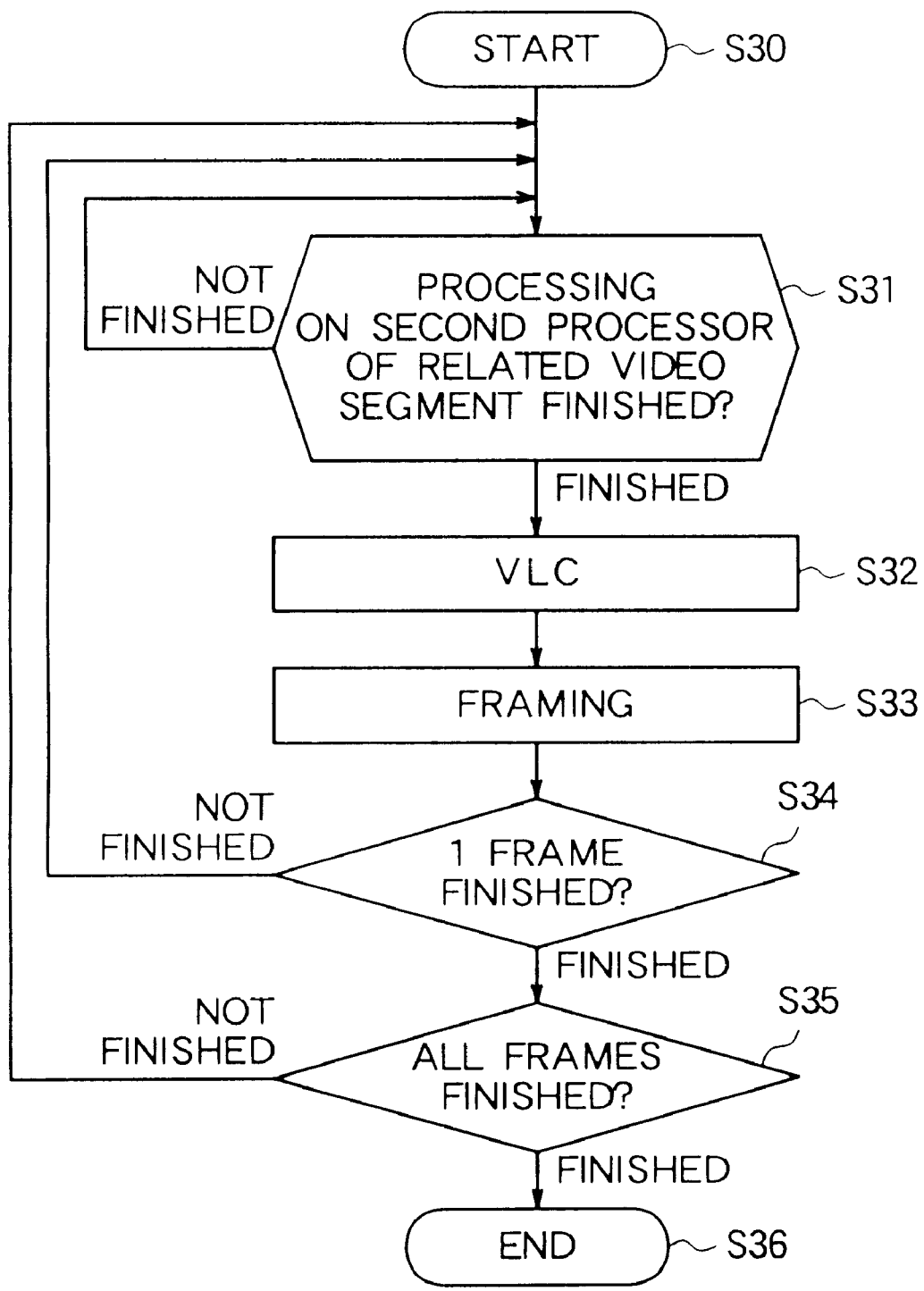
FIG. 11 is a flow chart of the processing in a third processor of the parallel processing unit in the case where the parallel processing unit shown in FIG. 8 encodes an image by a conventional parallel processing method.

When encoding an image, the three processors $2_{-1}$ to $2_{-3}$ carry out the processings as shown in FIG. 9 to FIG. 11. Namely, the first processor $2_{-1}$ carries out the processing as shown in the flow chart of FIG. 9, the second processor $2_{-2}$ carries out the processing as shown in the flow chart of FIG. 10, and the third processor $2_{-3}$ carries out the processing as shown in the flow chart of FIG. 11.

Note that the programs for carrying out these processings are stored in advance in the program ROM or the program RAN provided with respect to each processor $2_{-i}$. These processings are actually carried out by the operations of the processors $2_{-i}$ according to these programs.

Below, an explanation will be made of the processing in each processor $2_{-i}$ (i=1 to 3).

First, an explanation will be made of the processing of the first processor $2_{-1}$ by referring to FIG. 9.

When the encoding is started (step S10), the first processor $2_{-1}$ checks whether or not the processing in the second processor $2_{-2}$ of the previous video segment has been started and waits for the start of the processing (step S11).

When the processing is started at the second processor $2_{-2}$, the first processor $2_{-1}$ processes the next video segment by carrying out blocking to divide macroblocks (step S12) and carries out shuffling to generate the video segment (step S13).

Note that, at step S11, when the processing is carried out with respect to the first video segment immediately after the start of the encoding, that is, where there is no previous video segment, the operation routine immediately shifts to the processing of step S12.

Then, it checks whether or not the processed video segment is the last video segment of the frame (step S14) and, where it is the last video segment, further checks whether or not the frame is the last frame to be processed (step S15).

Both in cases where it is not the last segment at step S14 and where it is not the last frame at step S15, the operation routine returns to step S11, where the processing is repeated for the next video segment.

Further, where the processed video segment is the last video segment of the last frame at step S14 and step S15, the processing of the first processor $2_{-1}$ is ended (step S16).

Next, an explanation will be made of the processing of the second processor $2_{-2}$ by referring to FIG. 10.

When the processing is started (step S20), the second processor $2_{-2}$ checks whether or not the processing in the first processor $2_{-1}$ with respect to the video segment to be processed is finished and waits for the end of the processing (step S21).

When the processing is ended at the first processor $2_{-1}$, it detects motion in the video segment obtained as the result of this to determine the encoding mode of the DCT (step S22), then carries out the DCT and applies a predetermined filter to the obtained DCT result to carry out the weighting (step S23).

Next, it determines the class number for determining the quantization step (step S24), estimates the data amount based on the class number to determine the quantization step (step S25, and quantizes the DCT result obtained by step S23 (step S26).

Next, it checks whether or not the processed video segment is the last video segment of the frame (step S27) and, where it is the last video segment, further checks whether or not the frame is the last frame to be processed (step S28).

Both in cases where it is not the last segment at step S27 and where it is not the last frame at step S28, the operation routine returns to step S21, where the processing is repeated with respect to the next video segment.

Further, where the processed video segment is the last video segment of the last frame at step S27 and step S28, the processing of the second processor $2_{-2}$ is ended (step S29).

Next, an explanation will be made of the processing of the third processor $2_{-3}$ by referring to FIG. 11.

When the processing is started (step S30), the third processor $2_{-3}$ checks whether or not the processing in the second processor $2_{-2}$ with respect to the video segment to be processed is finished and waits for the end of the processing (step S31).

When the processing is ended at the second processor $2_{-2}$, it carries out variable length coding on the DCT result, i.e., quantized video segment to be processed obtained as the result of this (step S32) and carries out framing to generate five sync blocks (step S33).

Then, it checks whether or not the processed video segment is the last video segment of the frame (step S34) and, where it is the last video segment, checks whether or not the frame is the last frame to be processed (step S35).

Both in cases where it is not the last segment at step S34 and where it is not the last frame at step S35, the operation routine returns to step S31, where the processing is repeated with respect to the next video segment.

Further, where the processed video segment is the last video segment of the last frame at step S34 and step S35, the processing of the third processor $2_{-3}$ is ended (step S36).

Next, an explanation will be made of the operation of the parallel processing unit 9 in the case of encoding a moving picture by referring to FIG. 12.

Figure 12:
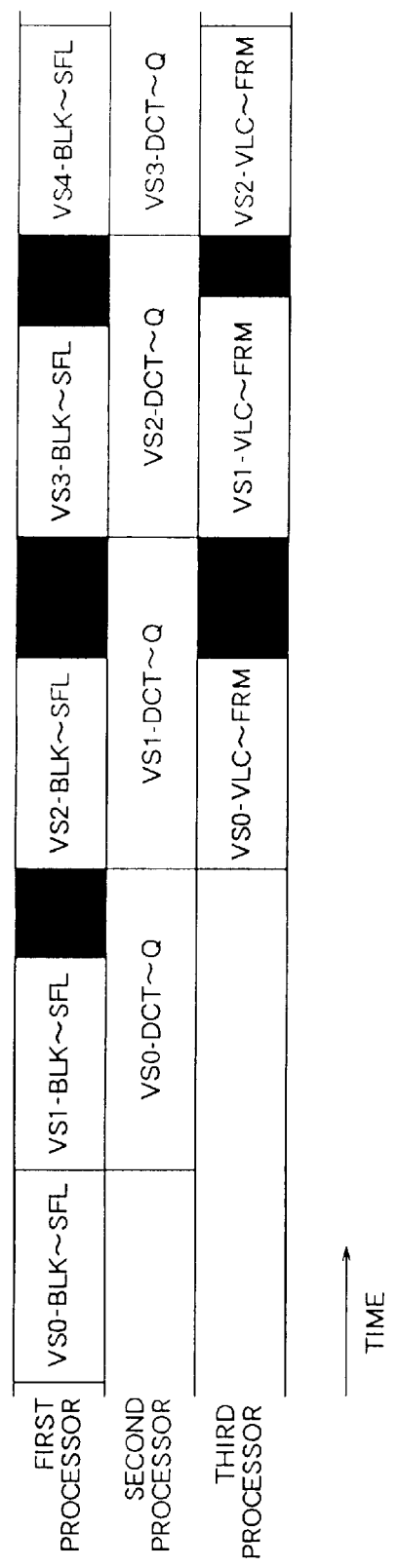
FIG. 12 is a timing chart of the state of the processing in each processor in the case where the parallel processing unit shown in FIG. 8 encodes an image by a conventional parallel processing method.

FIG. 12 is a timing chart of the state of the encoding in the three processors $2_{-1}$ to $2_{-3}$.

Note that, in FIG. 12, the processings VSj-BLK to SFL indicate blocking (BLK) and shuffling (SFL) with respect to a (j+1)th video segment j (step S12 and step S13 in FIG. 9); the processings VSj-DCT to Q indicate motion detection to quantization (Q) with respect to the (j+1)th video segment j (step S22 to step S26 in FIG. 10); and the processings VSj-VLC to FRM indicate variable length coding (VLC) and framing (FRM) with respect to the (j+1)th video segment j (step S32 and step S33 in FIG. 11).

As shown in FIG. 12, when the encoding is started, first, the first processor $2_{-1}$ carries out the processings VS0-BLK to SFL with respect to the first video segment 0.

Then, when the processings VS0-BLK to SFL are ended, the second processor $2_{-2}$ starts the processings VS0-DCT to Q with respect to the data of the video segment 0 for which the processing is ended. Further, simultaneously, the first processor $2_{-1}$ starts the processings VS1-BLK to SFL with respect to next video segment 1.

When the processings VS0-DCT to Q in the second processor $2_{-2}$ are ended, the third processor $2_{-3}$ starts the processings VS0-VLC to FRM with respect to the data of the video segment 0 for which the processing is ended. Further, simultaneously, the first processor $2_{-1}$ starts the processings VS2-BLK to SFL with respect to a third video segment 2, and the second processor $2_{-2}$ starts the processings VS2-DCT to Q with respect to the second video segment 1.

Note that the processings VS1-BLK to SFL with respect to the second video segment 1 in the first processor $2_{-1}$ are ended before the end of the processings VS0-DCT to Q in the second processor $2_{-2}$, but in order to make three processors $2_{-1}$ to $2_{-3}$ operate in synchronization, the first processor $2_{-1}$ starts the processing with respect to the next third video segment 2 after waiting for the end of the processings VS0-DCT to Q in the second processor $2_{-2}$.

Thereafter, similarly, predetermined processings are sequentially carried out in each processor $2_{-i}$ for the encoding with respect to sequentially input video segments.

In this case, each processor $2_{-i}$ proceeds with the processing while maintaining synchronization with each other by simultaneously starting the processing with respect to one video segment.

Next, an explanation will be made of the processing in each processor $2_{-i}$ (i=1 to 3) and the operation of the parallel processing unit 9 where the parallel processing unit 9 decodes a moving picture as mentioned above.

First, an explanation will be made of the processing in each processor $2_{-i}$.

Figure 13:
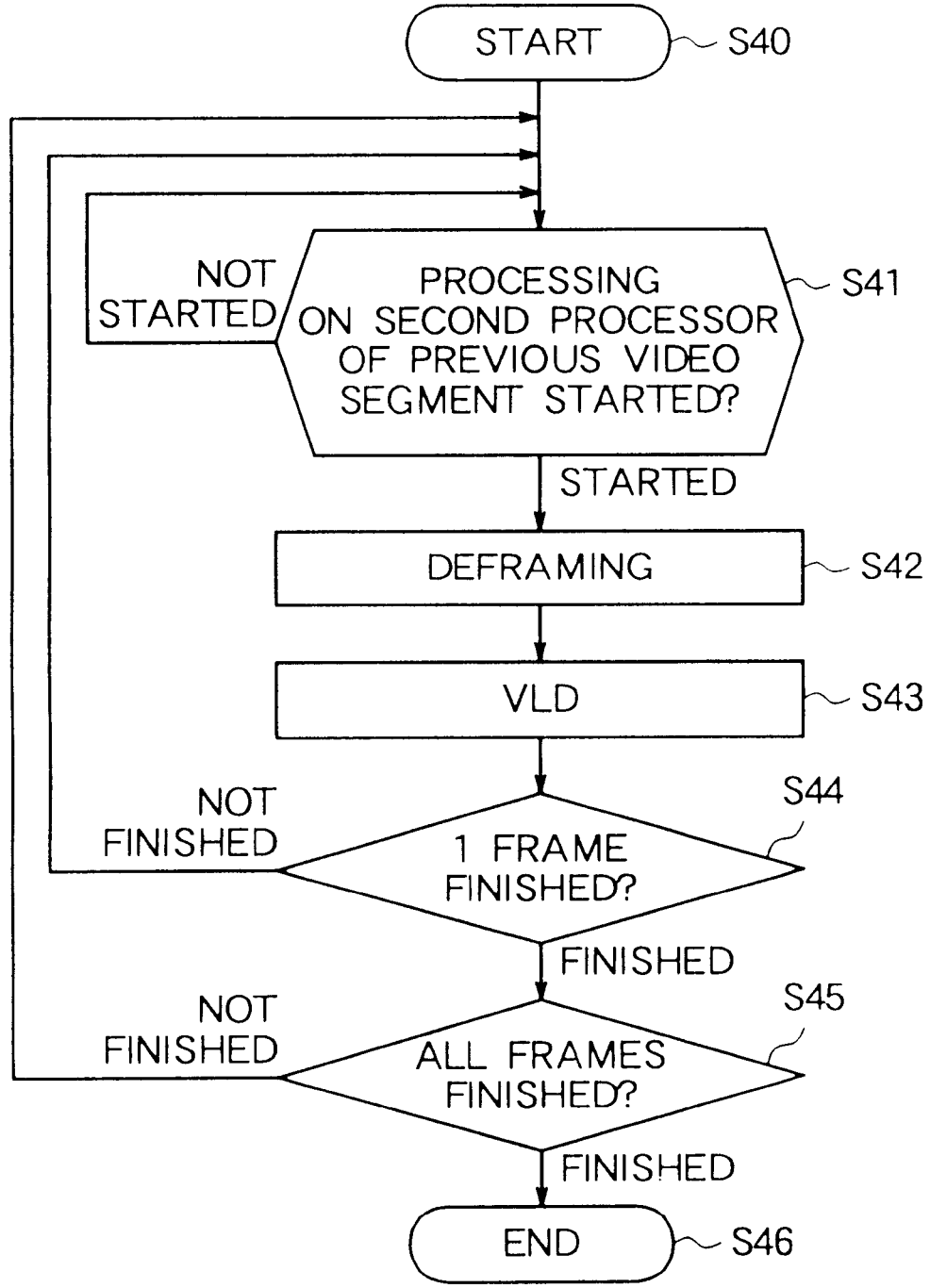
FIG. 13 is a flow chart of the processing in the first processor of the parallel processing unit in the case where the parallel processing unit shown in FIG. 8 decodes an image by a conventional parallel processing method.
Figure 14:
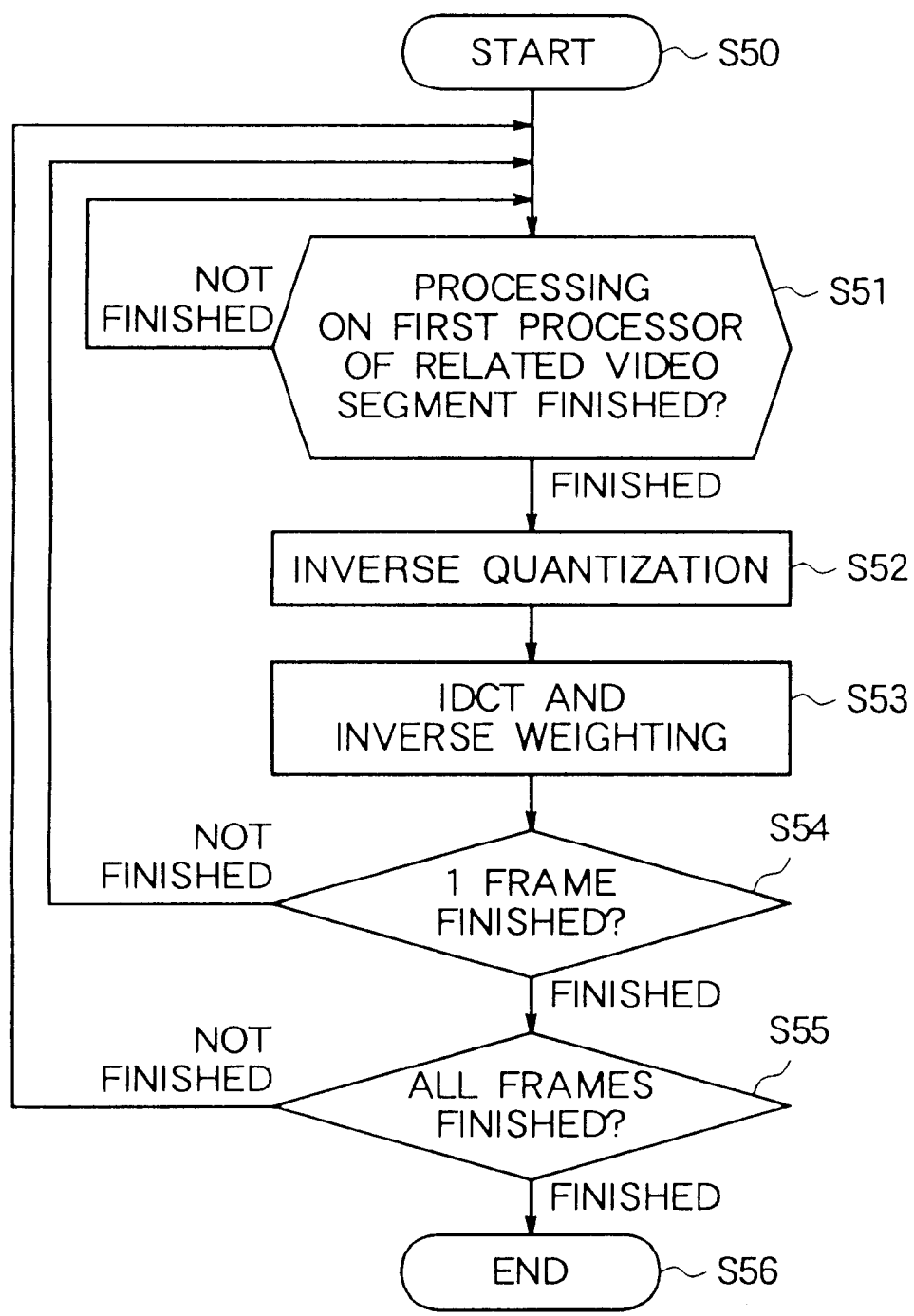
FIG. 14 is a flow chart of the processing in the second processor of the parallel processing unit in the case where the parallel processing unit shown in FIG. 8 decodes an image by a conventional parallel processing method.
Figure 15:
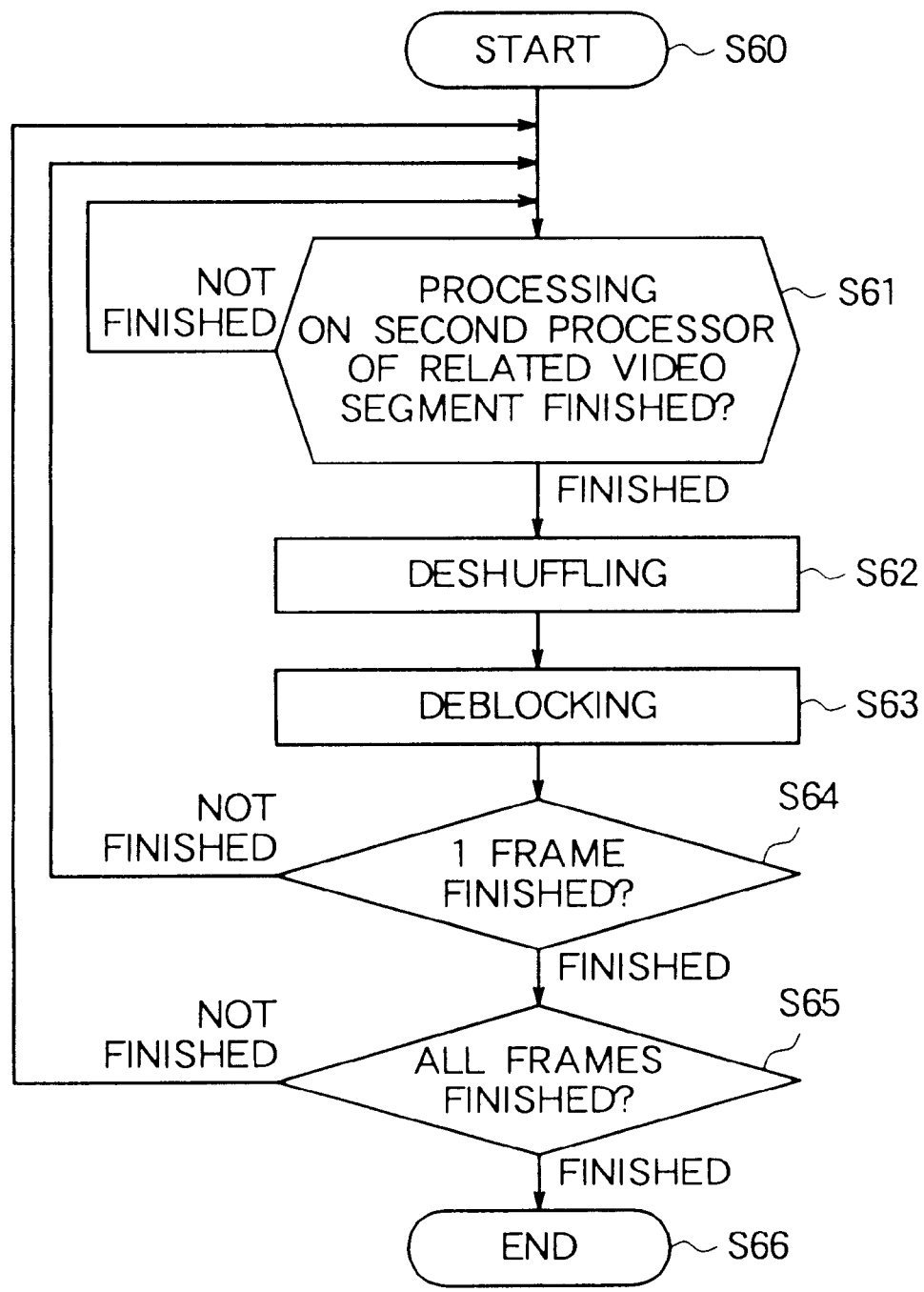
FIG. 15 is a flow chart of the processing in the third processor of the parallel processing unit in the case where the parallel processing unit shown in FIG. 8 decodes an image by a conventional parallel processing method.

When decoding an image, the three processors $2_{-1}$ to $2_{-3}$ carry out the processings as shown in FIG. 13 to FIG. 15. Namely, the first processor $2_{-1}$ carries out the processing as shown in the flow chart of FIG. 13, the second processor $2_{-2}$ carries out the processing as shown in the flow chart of FIG. 14, and the third processor $2_{-3}$ carries out the processing as shown in the flow chart of FIG. 15.

Note that the programs for carrying out these processings are stored in advance in the program ROM or the program RAM provided with respect to each processor $2_{-i}$ in the same way as the programs for carrying out the above encoding.

Below, an explanation will be made of the processing in each processor $2_{-i}$ (i=1 to 3).

First, an explanation will be made of the processing of the first processor $2_{-1}$ by referring to FIG. 13.

When the decoding is started (step S40), the first processor $2_{-1}$ checks whether or not the processing in the second processor $2_{-2}$ of the previous video segment is started and waits for the start of the processing (step S41).

When the processing is started at the second processor $2_{-2}$, the first processor $2_{-1}$ processes the next video segment by deframing for moving the data among the sync blocks to restore the data corresponding to macroblocks (step S42) and carrying out variable length decoding with respect to the obtained data for every macroblock (step S43).

Note that, at step S41, where the processing is carried out with respect to the first video segment immediately after the start of the decoding, that is. where there is no previous video segment, the operation routine immediately shifts to the processing of step S42.

Then, it checks whether or not the processed video segment is the last video segment of the frame (step S44) and, where it is the last video segment, checks whether or not the frame is the last frame to be processed (step S45).

Both in cases where it is not the last segment at step S44, and where it is not the last frame at step S45, the operation routine returns to step S41, where the processing is repeated with respect to the next video segment.

Further, where the processed video segment is the last video segment of the last frame at step S44 and step S45, the processing of the first processor $2_{-1}$ is ended (step S46).

Next, an explanation will be made of the processing of the second processor $2_{-2}$ by referring to FIG. 14.

When the processing is started (step S50), the second processor $2_{-2}$ checks whether or not the processing in the first processor $2_{-1}$ with respect to the video segment to be processed is ended and waits for the end of the processing (step S51).

When the processing is ended at the first processor $2_{-1}$, it carries out the inverse quantization on the variable length decoded data for every video segment obtained as the result of this (step S52) and carries out inverse DCT and inverse weighting with respect to the inverse quantized DCT result to convert this to the original pixel data (step S53).

Then, it checks whether or not the video segment subjected to the processings heretofore is the last video segment of the frame (step S54) and, where it is the last video segment, further checks whether or not the frame is the last frame to be processed (step S55).

Both in cases where it is not the last segment at step S54 and where it is not the last frame at step S55, the operation routine returns to step S51, where the processing is repeated with respect to the next video segment.

Further, where the processed video segment is the last video segment of the last frame at step S54 and step S55, the processing of the second processor $2_{-2}$ is ended (step S56).

Next, an explanation will be made of the processing of the third processor $2_{-3}$ by referring to FIG. 15.

When the processing is started (step S60), the third processor $2_{-3}$ checks whether or not the processing in the second processor $2_{-2}$ with respect to the video segment to be processed is ended and waits for the end of the processing (step S61).

When the processing is ended at the second processor $2_{-2}$, it carries out deshuffling on the pixel data of the video segment to be processed obtained as the result of this to return the same to the data at the original position in the frame (step S62) and further converts it to data of the raster scan system by deblocking (step S63).

Then, it checks whether or not the processed video segment is the last video segment of the frame (step S64) and, where it is the last video segment, checks whether or not the frame is the last frame to be processed (step S65).

Both in cases where it is not the last segment at step S64 and where it is not the last frame at step S65, the operation routine returns to step S61, where the processing is repeated with respect to the next video segment.

Further, where the processed video segment is the last video segment of the last frame at step S64 and step S65, the processing of the third processor $2_{-3}$ is ended (step S66).

Next, an explanation will be made of the operation of the parallel processing unit 9 when decoding a moving picture by referring to FIG. 16.

Figure 16:
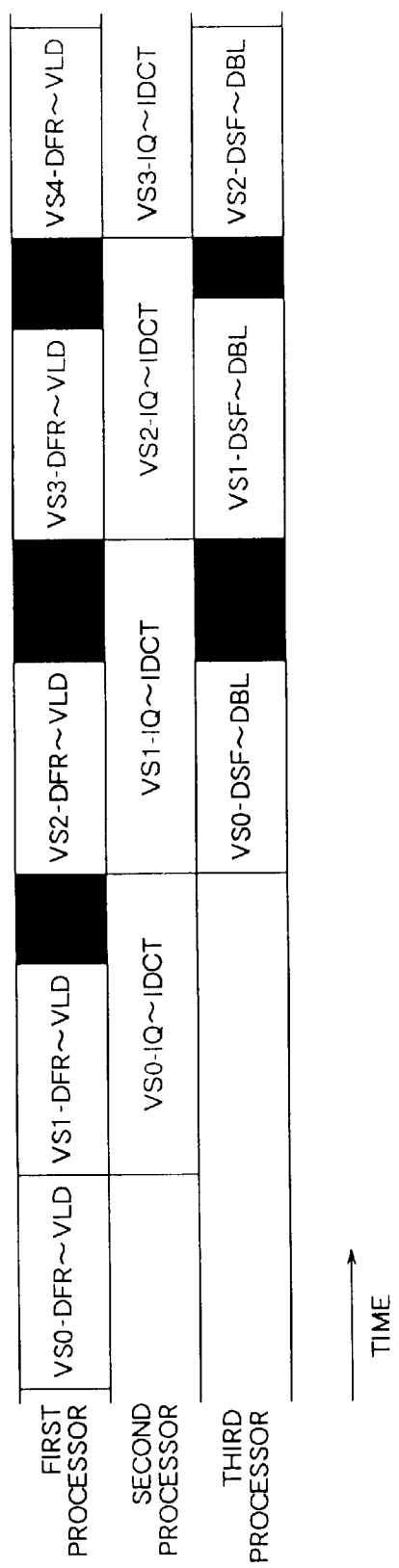
FIG. 16 is a timing chart of the state of the processing in each processor of the parallel processing unit in the case where the parallel processing unit shown in FIG. 8 decodes an image by a conventional parallel processing method.

FIG. 16 is a timing chart of the state of the decoding in the three processors $2_{-1}$ to $2_{-3}$.

Note that, in FIG. 16, the processings VSj-DFR to VLD indicate deframing (DFR) and variable length decoding (VLD) with respect to the (j+1)th video segment j (step S42 and step S43 in FIG. 13); the processings VSj-IQ to IDCT indicate inverse quantization (IQ) and inverse DCT (IDCT) with respect to the (J+1)th video segment j (step S52 and step S53 in FIG. 14); and the processings VSj-DSF to DBL indicate deshuffling (DSF) and deblocking (DBL) with respect to the (j+1)th video segment j (step S62 and step S63 in FIG. 15).

As shown in FIG. 16, when the decoding is started, first, the first processor $2_{31\ 1}$ carries out the processings VS0-DFR to VLD with respect to the first video segment 0.

Then, when the processings VS0-DFR to VLD are ended, the second processor $2_{-2}$ starts the processings VS0-IQ to IDCT with respect to the data of the video segment 0 for which the processing is ended. Further, simultaneously, the first processor $2_{-1}$ starts the processings VS1-DFR to VLD with respect to next video segment 1.

When the processings VS0-IQ to IDCT in the second processor $2_{-2}$ are ended, the third processor $2_{-3}$ starts the processings VS0-DSF to DBL with respect to the data of the video segment 0 for which the processing is ended. Further, simultaneously, the first processor $2_{-1}$ starts the processings VS2-BLK to SFL with respect to a third video segment 2, and the second processor $2_{-2}$ starts the processings VS2-DFR to VLD with respect to the second video segment 1.

Note that the processings VS1-DFR to VLD with respect to the second video segment 1 in the first processor $2_{-1}$ are ended before the end of the processings VS0-IQ to IDCT in the second processor $2_{-2}$, but in order to make three processors $2_{-1}$ to $2_{-3}$ operate in synchronization, the first processor $2_{-1}$ starts the processing with respect to the next third video segment 2 after waiting for the end of the processings VS0-IQ to IDCT in the second processor $2_{-2}$.

Thereafter, similarly, predetermined processings are sequentially carried out in each processor $2_{-i}$ for decoding with respect to sequentially input video segments.

In this case, each processor $2_{-i}$ proceeds with the processing while maintaining synchronization with each other by simultaneously starting the processing with respect to one video segment.

In this way, in the first image coding/decoding apparatus, each of the processing steps of the encoding and the decoding is divided into three steps which are distributed among the three processors $2_{-1}$ to $2_{-3}$ for processing. Accordingly, the data for each sequentially input video segment is sequentially processed at these three processors $2_{-1}$ to $2_{-3}$, whereby it is converted to the intended compressed encoded data or restored image data. Then, by carrying out the encoding and decoding of the image by the parallel processing in this way, a higher speed processing compared with the case where the processing is carried out by one processor as usual can be carried out.

Second Image Coding/Decoding Apparatus

In the first image coding/decoding apparatus, however, the disadvantage was found that the load became unequal among the three processors $2_{-1}$ to $2_{-3}$.

For example, in the encoding shown in FIG. 12, the load of the processing in the second processor $2_{-1}$ is the heaviest, therefore the first processor $2_{-1}$ and the third processor $2_{-3}$ frequently became idle. Further, also in the decoding shown in FIG. 16, the load of the processing in the second processor $2_{-1}$ is the heaviest, therefore the first processor $2_{-1}$ and the third processor $2_{-3}$ frequently became idle.

Further, in the first image coding/decoding apparatus, since the processings to be executed in the processors were different, it was necessary to separately control the processors and establish synchronization for the transfer of data and communication, so there also arises the disadvantage of complication of the control.

Therefore, an explanation will be made of an image coding/decoding apparatus according to the present invention solving such disadvantages, capable of carrying out the encoding and the decoding of an image at a higher speed, and further capable of simplifying the configuration and control method as a second image coding/decoding apparatus.

The hardware configuration of the second image coding/decoding apparatus is the same as that of the above first image coding/decoding apparatus.

Namely, the parallel processing unit 1 thereof has the configuration as shown in FIG. 8, that is, has n number of processors $2_{-1}$ to $2_{-n}$, a memory 3, and a connection network 4. Note that the hardware configurations of these constituent parts are the same as those of the case of the parallel processing unit 9 of the first image coding/decoding apparatus, therefore the explanation will be made by using same reference numerals.

Further, the functions and configurations of the parts from the n number of processors $2_{-1}$ to $2_{-n}$ to the connection network 4 are the same as those of the case of the parallel processing unit 9 of the first image coding/decoding apparatus mentioned, therefore explanations thereof will be omitted.

Further, in the case of the parallel processing unit 1 of the second image coding/decoding apparatus as well, the number n of the processors 2 is 3.

In such parallel processing unit 1 of the second image coding/decoding apparatus having the same hardware configuration as that of the parallel processing unit 9 of the first image coding/decoding apparatus, the processing method of the encoding and the decoding of a moving picture and the operation of each processor $2_{-i}$ (i=1 to 3) etc. are different from those of the first image coding/decoding apparatus.

Namely, the programs stored in the program ROMs or program RAMs provided with respect to the three processors $2_{-1}$ to $2_{-3}$ are different from those of the case of the first image coding/decoding apparatus. By this, the parallel processing unit 1 of the second image coding/decoding apparatus carries out different processing from that of the parallel processing unit 9 of the first image coding/decoding apparatus as a whole.

Below, in the parallel processing unit 1 of the second image coding/decoding apparatus, an explanation will be made of the processing in each processor $2_{-i}$ (i=1 to 3) and the operation of the parallel processing unit 1 for the case where a moving picture is encoded and decoded.

First, an explanation will be made of the processing in each processor $2_{-i}$ when encoding a picture.

In the second image coding/decoding apparatus, a not illustrated control unit etc. in the parallel processing unit 1 is used to suitably distribute numbers of video segments to be processed to each of three processors $2_{-1}$ to $2_{-3}$. Then, each processor $2_{-i}$ carries out a series of encoding with respect to distributed video segments. Accordingly, each processor $2_{-i}$ operates according to the same processing program as shown in the flow chart of FIG. 17.

An explanation will be made of the processing to be carried out in each processor $2_{-i}$.

First, when the encoding is started (step S70), the processor $2_{-i}$ acquires the number of the video segment to be processed distributed to it (step S71). Then, it carries out blocking on the video data to be encoded to divide it into macroblocks (step S72) and extracts the data of the macroblocks which will constitute the video segment by shuffling based on the number of the video segment acquired at step S71 to generate the data of the video segment to be processed (step S73).

After generating the video segment to be processed, next it carries out motion detection to determine the encoding mode of the DCT (step S74) and carries out the actual DCT and applies a predetermined filter to the obtained DCT result to carry out the weighting (step S75).

Next, it determines the class number for determining the quantization step (step S76), estimates the data amount based on the class number to determine the quantization step (step S77), and carries out the quantization on the DCT result obtained by step S75 (step S78).

Then, it carries out variable length coding on the quantized DCT result (step S79) and carries out framing to generate five sync blocks (step S80). Note that the data of the generated sync blocks are stored in for example a predetermined region of the memory 3 as the encoded data.

Then, it checks whether or not the video segment subjected to the processings heretofore is the last video segment of the frame to be encoded at present (step S81) and, where it is the last video segment, further checks whether or not the frame is the last frame to be processed (step S82).

Both in cases where it is not the last video segment at step S81 and where it is not the last frame at step S82, the operation routine returns to step S71, at which the processor acquires the number of the next video segment and repeats the encoding of step S72 to step S80 with respect to the video segment.

Further, where the processed video segment is the last video segment of the last frame at step S81 and step S82, the series of encoding with respect to the image data is ended (step S83).

Next, an explanation will be made of the operation of the parallel processing unit 1 where three processors $2_{-1}$ to $2_{-3}$ operate by such a processing procedure by referring to FIG. 18.

Figure 17:
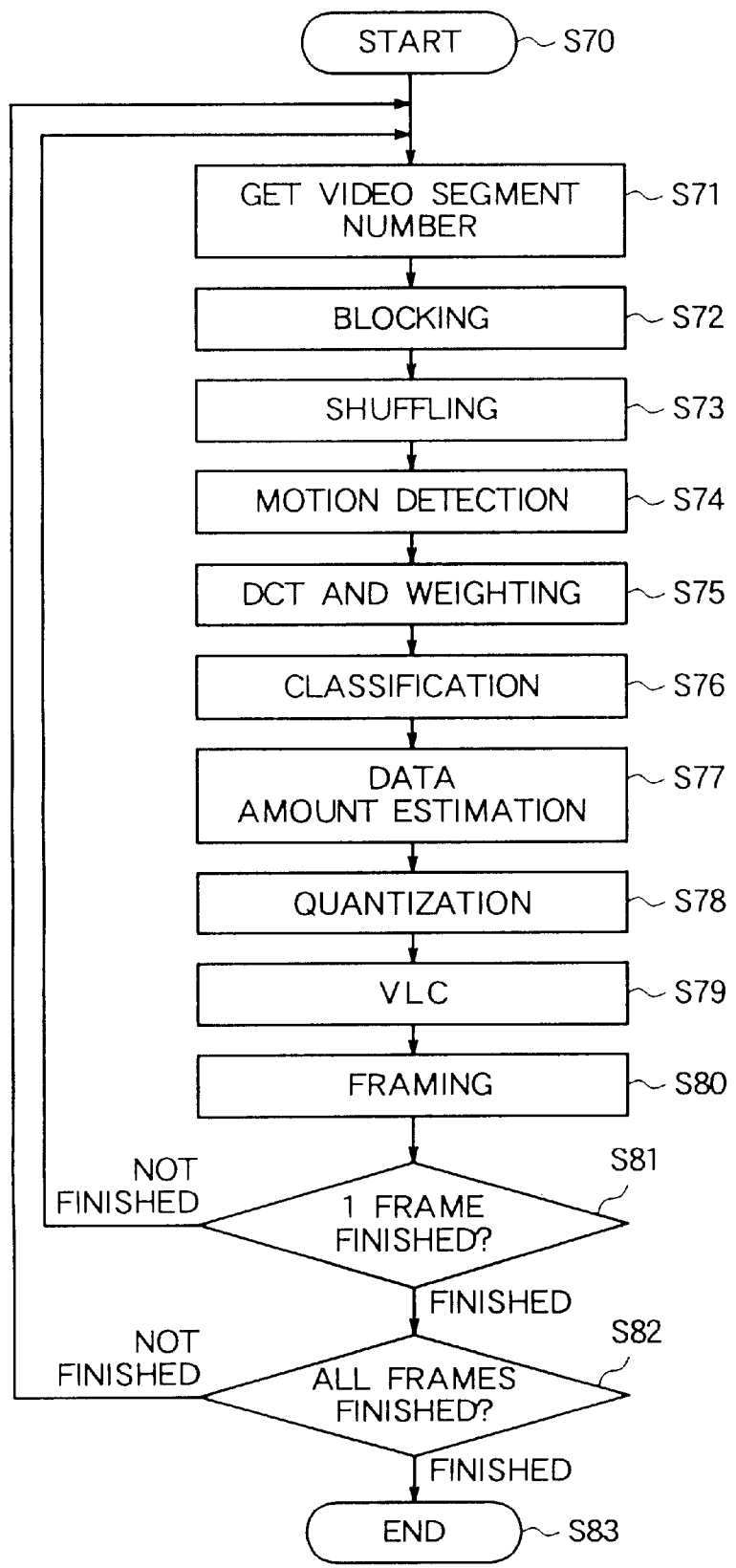
FIG. 17 is a flow chart of the processing in each processor of the parallel processing unit in the case where the parallel processing unit shown in FIG. 8 encodes an image by a parallel processing method of the present invention.
Figure 18:
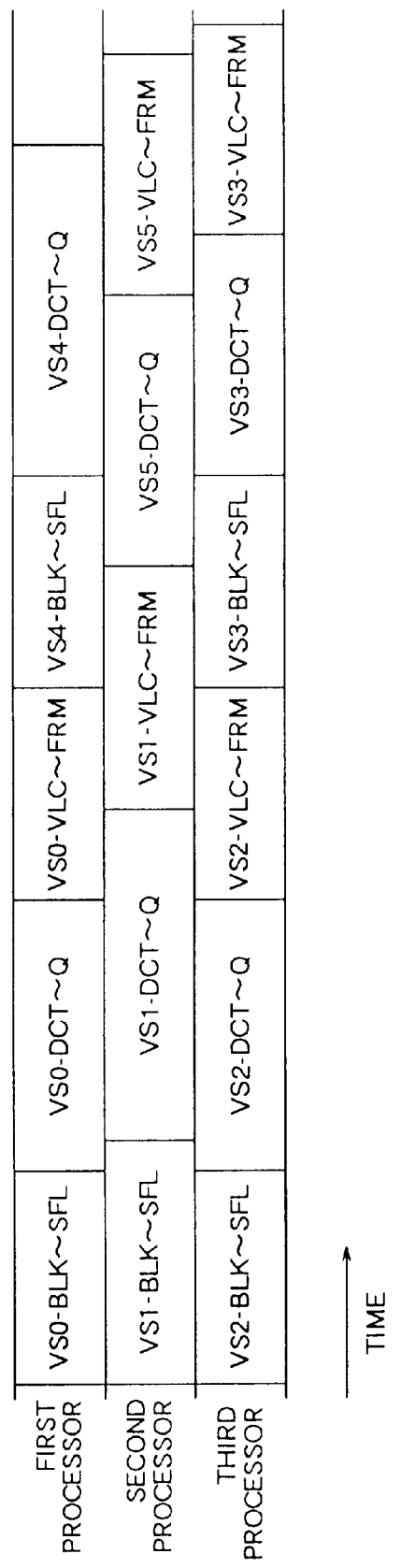
FIG. 18 is a timing chart of the state of the processing in each processor of the parallel processing unit in the case where the parallel processing unit shown in FIG. 8 encodes an image by a parallel processing method of the present invention.

Note that, in FIG. 18, the processings VSj-BLK to SFL indicate blocking (BLK) and shuffling (SFL) with respect to a (j+1)th video segment j (step S72 and step S73 in FIG. 17); the processings VSj-DCT to Q indicate motion detection to the quantization (Q) with respect to the (j+1)th video segment j (step S74 to step S78 in FIG. 17); and the processings VSj-VLC to FRM indicate variable length encoding (VLC) and framing (FRM) with respect to the (j+1)th video segment j (step S79 and step S80 in FIG. 17).

As illustrated, when the encoding is started, first, the number of each video segment to be processed is indicated with respect to the three processors $2_{-1}$ to $2_{-3}$. Each processor $2_{-i}$ acquires the number of the video segment and independently starts the encoding with respect to the video segments.

Namely, as shown in FIG. 18, the processings VS0-BLK to SFL of the first video segment 0 are started in the first processor $2_{-1}$; the processings VS1-BLK to SFL of the second video segment 1 are started in the second processor $2_{-2}$; and the processings VS2-BLK to SFL of the third video segment 2 are started in the third processor $2_{-3}$.

Each processor $2_{-i}$ sequentially carries out processings by the same processing procedure as shown in FIG. 17, but the processing time becomes different according to the data of the video segment to be processed. However, each processor $2_{-i}$ sequentially continues the processing regardless of the state of progress of the processing of the other processors $2_{-i}$.

Accordingly, when the first processings VSj-BLK to SFL of the distributed video segment are ended in each processor $2_{-i}$, the second processings VSj-DCT to Q are sequentially started by the processors $2_{-i}$ finishing the processings. Further, when the second processings VSj-DCT to Q are ended, third processings VSj-VLC to FRM are sequentially started by the processors $2_{-i}$ finishing the processings.

Then, when the processing with respect to one video segment is ended in any processor $2_{-i}$, the processor $2_{-i}$ acquires the number of the new video segment to be processed and carries out the encoding from the first processings VSj-BLK to SFL again with respect to the video segment.

In the example shown in FIG. 18, among the processings with respect to the first video segment in the processors $2_{-i}$, the processing with respect to the third video segment 2 in the third processor $2_{-3}$ ends first. Accordingly, the processing with respect to the next video segment to be encoded, that is, a fourth video segment 3, is instructed to the third processor $2_{-3}$. The third processor $2_{-3}$, after finishing the encoding of the video segment 2, immediately acquires the number indicating this video segment 3 and starts the processings VS3-BLK to SFL with respect to the video segment 3.

Thereafter, similarly, when the first processor $2_{-1}$ finishes the encoding of the first video segment 0, the first processor $2_{-1}$ is instructed to carry out processing with respect to a fifth video segment 4. The first processor $2_{-1}$ then immediately starts the first processings VS4-BLK to SFL with respect to this video segment 4. Further, the second processor $2_{-2}$, immediately after the end of the encoding of the second video segment 1, starts the processing with respect to a sixth video segment 5.

Next, an explanation will be made of the processing in each processor $2_{-i}$ when the second image coding/decoding apparatus carries out decoding.

In the case of the decoding as well, in the same way as the case of the encoding mentioned above, a not illustrated control unit etc. in the parallel processing unit 1 is used to distribute numbers of video segments to be processed to each of the three processors $2_{-1}$ to $2_{-3}$. Each processor $2_{-i}$ continuously carries out the decoding with respect to the distributed video segments. Accordingly, each processor $2_{-i}$ operates according to the same processing program as shown in the flow chart of FIG. 19.

An explanation will be made of the processing to be carried out in each processor $2_{-i}$.

First, when the encoding is started (step S90), the processor $2_{-i}$ acquires the number of the video segment to be processed distributed to it (step S91). Then, it acquires the compressed data of the designated video segment and carries out framing to move the data among the sync blocks to restore the data corresponding to the macroblocks (step S92).

Next, it carries out variable length decoding on the obtained data for every macroblock (step S93) and carries out inverse quantization with respect to the variable length decoded data (step S94).

Next, it carries out inverse DCT and inverse weighting with respect to the inverse quantized DCT result to transform the same to the original pixel data (step S95), carries out deshuffling to restore the data to the data of the original position in the frame based on the number of the video segment acquired at step S91 (step S96), and further converts the same to the data of the raster scan system (step S97) to obtain the original image data.

Then, it checks whether or not the video segment subjected to the processings heretofore is the last video segment to be decoded at present (step S98) and, where it is the last video segment, further checks whether or not the frame is the last frame to be processed (step S99).

In both oases where it is not the last video segment at step S98 and where it is not the last frame at step S99, the operation routine returns to step S91, at which the number of the next video segment is acquired and the decoding of step S92 to step S97 is repeated with respect to the video segment.

Further, where the processed video segment is the last video segment of the last frame at step S98 and step S99, the series of encoding with respect to the image data is ended (step S100).

Next, an explanation will be made of the operation of the parallel processing unit 1 where the three processors $2_{-1}$ to $2_{-3}$ operate to carry out the decoding by such a processing procedure referring to FIG. 20.

Figure 19:
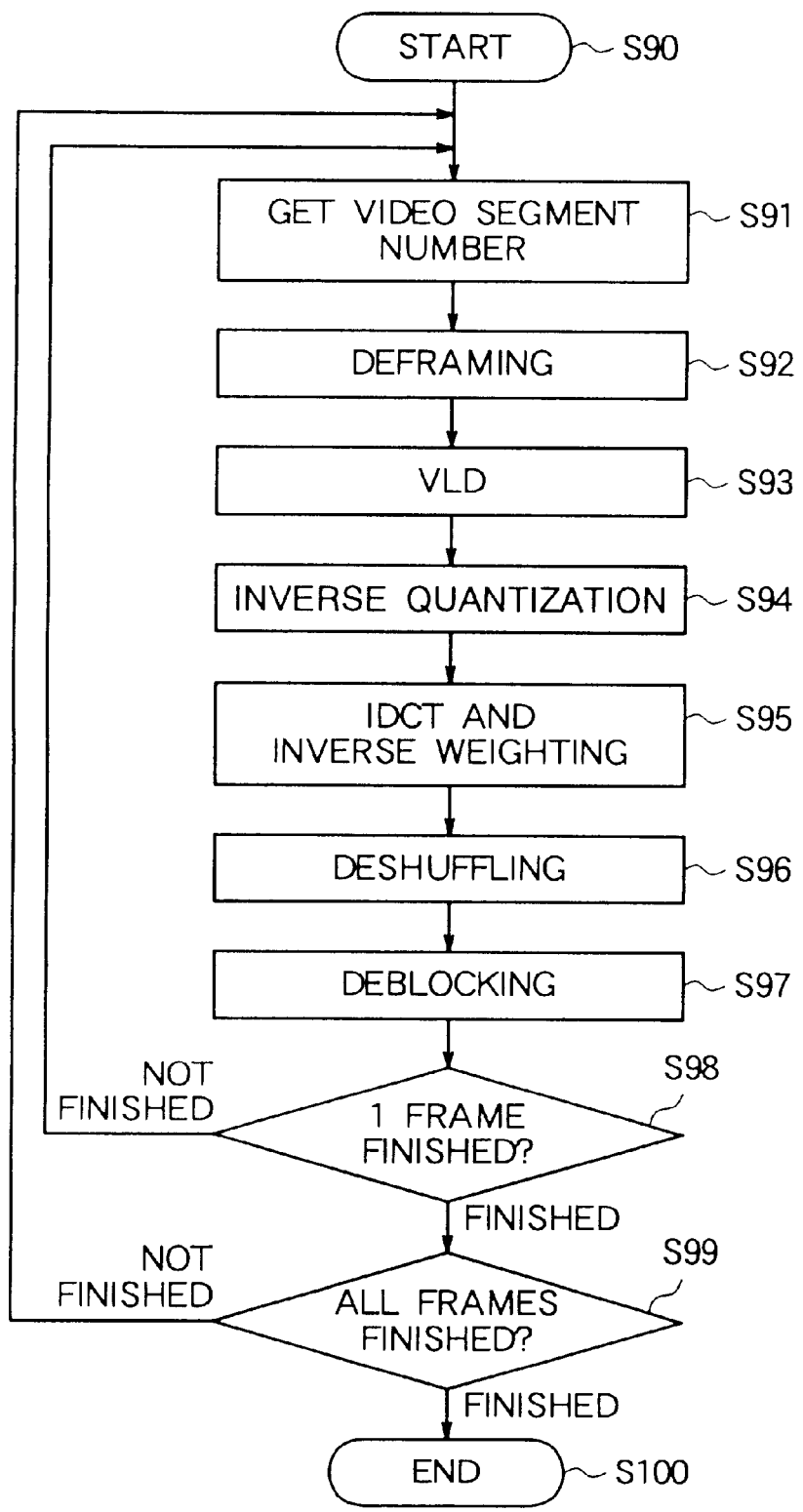
FIG. 19 is a flow chart of the processing in each processor of the parallel processing unit in the case where the parallel processing unit shown in FIG. 8 encodes an image by a parallel processing method of the present invention.
Figure 20:
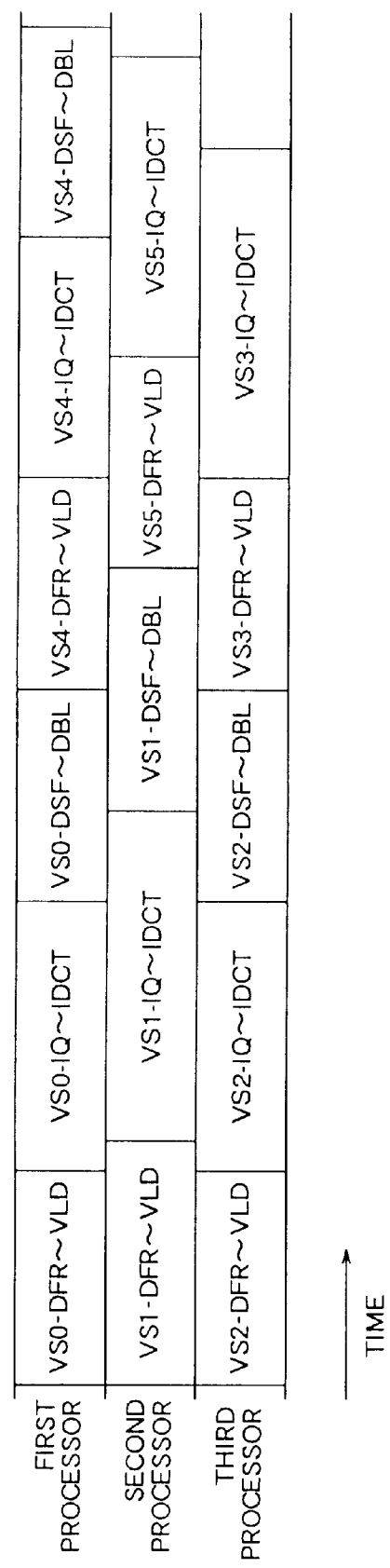
FIG. 20 is a timing chart of the state of the processing in each processor of the parallel processing unit in the case where the parallel processing unit shown in FIG. 8 encodes an image by a parallel processing method of the present invention.

Note that, in FIG. 20, the processings VSj-DFR to VLD indicate defraying (DFR) and variable length decoding (VLD) with respect to the (j+1)th video segment j (step S92 and step S93 in FIG. 19); the processings VSj-IQ to IDCT indicate inverse quantization (IQ) and inverse DCT (IDCT) with respect to the (j+1)th video segment j (step S94 and step S95 in FIG. 19); and the processings VSj-DSF to DBL indicate deshuffling (DSF) and deblocking (DBL) with respect to the (j+1)th video segment j (step S96 and step S97 in FIG. 19).

As illustrated, when the decoding is started, first, the numbers of video segments to be processed are indicated with respect to the three processors $2_{-1}$ to $2_{-3}$. Each processor $2_{-i}$ acquires the number of the video segment and independently starts the decoding with respect to the video segment.

Namely, as shown in FIG. 20, the processings VS0-DFR to VLD of the first video segment 0 are started in the first processor $2_{-1}$, the processings VS1-DFR to VLD of the second video segment 1 are started in the second processor $2_{-2}$, and the processings VS2-DFR to VLD of the third video segment 2 are started in the third processor $2_{-3}$.

Each processor $2_{-i}$ sequentially carries out processing by the same processing procedure as shown in FIG. 19, but the processing times become different according to the data of the video segment to be processed. However, each processor $2_{-i}$ sequentially continues the processing regardless of the state of progress of the processing of the other processors $2_{-i}$.

Accordingly, the first processings VSj-DFR to VLD of the distributed video segment are ended in each processor $2_{-i}$, the second processings VSj-IQ to IDCT are sequentially started by the processors $2_{-i}$ finishing the processings. Further, when the second processings VSj-IQ to IDCT are ended, third processings VSj-DSF to DBL are sequentially started from the processors $2_{-i}$ finishing the processings.

Then, when the processing with respect to one video segment is ended in any processor $2_{-i}$, the processor $2_{-i}$ acquires the number of a new video segment to be processed and carries out the decoding from the first processings VSj-DFR to VLD again with respect to the video segment.

In the example shown in FIG. 20, in the processings with respect to the first video segment in the processors $2_{-i}$, the processing with respect to the third video segment 2 in the third processor $2_{-3}$ ended first. Accordingly, the third processor $2_{-3}$ is instructed to carry out the processing with respect to a next video segment to be decoded, that is, the fourth video segment 3. The third processor $2_{-3}$, after the end of the decoding of the video segment 2, immediately acquires the number indicating this video segment 3 and starts the processings VS3-DFR to VLD with respect to the video segment 3.

Thereafter, similarly, when the first processor $2_{-1}$ ends the decoding with respect to the first video segment 0, the first processor $2_{-1}$ is instructed to carry out processing with respect to a fifth video segment 4. The first processor $2_{-1}$ immediately starts the first processings VS4-DFR to VLD with respect to this video segment 4. Further, the second processor $2_{-2}$, immediately after the end of the decoding of the second video segment 1, starts the processing with respect to a sixth video segment 5.

In this way, in the second image coding/decoding apparatus, unlike the first image coding/decoding apparatus, each of the plurality of processors $2_{-1}$ to $2_{-n}$ continuously carry out all of the series of encoding or all of the series of decoding for the distributed video segments to be processed. Since the data of each video segment is fixed length data suited to random access and since there is no dependency at all among data of the video segments, there is no need for synchronization and data communication among processors. Accordingly, each processor $2_{-i}$ does not have to become idle for securing synchronization with the other processors $2_{-i}$, so all of the processing time can be applied to the encoding and decoding. As a result, the loads in the three processors $2_{-1}$ to $2_{-3}$ substantially become equal, and the encoding and the decoding can be carried out efficiently and at a high speed.

While the invention has been described by reference to specific embodiments chosen for purposes of illustration, it should be apparent that numerous modifications could be made thereto by those skilled in the art without departing from the basic concept and scope of the invention.

For example, in the processing of each processor $2_{-i}$ at the time of encoding shown in FIG. 17, each processor $2_{-i}$ acquires the number of the video segment (step S71) and then carries out the blocking with respect to the frame to be encoded based on this number (step S72). However, an actual processing for this blocking need only be carried out once for all frames, therefore it is preferably carried out in advance before the parallel processing in the three processors $2_{-1}$ to $2_{-3}$. In this case, the blocking of step S72 shown in FIG. 17 may be thought of as confirmation of the result of the blocking for carrying out step S73.

Further, it is also possible to carry out the shuffling in each processor $2_{-i}$ as shown in FIG. 17 or carry out the shuffling in advance in a state where all of the frames are easy to refer to in the same way as in the blocking.

Similarly, the deshuffling (step S96) and deblocking (step S97) at the time of decoding shown in FIG. 19 can be carried out as a whole after the end of the parallel processing in each processor $2_{-i}$.

In this way, it is possible even if a pretreatment-like processing of encoding and a post-treatment-like processing of decoding are carried out like the parallel processing by each processor $2_{-i}$, or they are carried out in advance, and the structure thereof is optional.

Further, the parallel processing unit of the image coding/decoding apparatus mentioned above was configured by a plurality of processors carrying out predetermined operations according to the programs and carried out the desired processing by having these operate in parallel, but it may also be configured by a plurality of processing units constituted by exclusive hardware and operating in parallel.

Further, in a configuration where the processing is carried out according to programs as in the present embodiment, the parallel processing unit of the present embodiment had n number of processors $2_{-1}$ to $2_{-n}$ each having a program ROM or a program RAM and each operating according to the program stored therein. However, the n number of processors $2_{-1}$ to $2_{-n}$ of the parallel processing unit 1 of the second image coding/decoding apparatus carry out the operation according to the same program. Accordingly, the memories for storing the processing programs of these n number of processors $2_{-1}$ to $2_{-n}$ can be shared and constituted so too. If such a configuration is adopted, the required amount of memory can be reduced, so a further reduction of size of the apparatus becomes possible.

Further, the program may be stored in a ROM in advance and provided in the parallel processing unit of the image encoding/decoding apparatus or may be stored in a hard disk, CD-ROM, or other storage medium and read into the program RAM or the like at the time execution.

Further, in the present embodiment, as shown in FIG. 8, a parallel computer system of a shared memory type was exemplified as the processing apparatus according to the present invention, but the hardware configuration is not limited to this. It can be also a message communication type parallel computer system which does not have a shared memory and transfers the data etc. by so-called message communication.

Further, the system need not be a parallel computer system in which processors are closely connected as in the present embodiment. It may also be a system in which the computers are independent from each other and connected by any communication means to carry out the desired processing in cooperation.

Namely, the actual configuration of the computers can be freely determined.

Further, in the present embodiment, DCT was used as the transform method to be carried out at the encoding and the decoding. However, any orthogonal transform method can be used as this transform method. Any transform, for example, a Fourier transform such as fast Fourier transform (FFT) and discrete Fourier transform (DFT), Hadamard transform, and K-L transform can be used.

Further, the present invention can be applied to processings other than the encoding and decoding of a moving picture given as an example in the present embodiment. It can be applied to the encoding and decoding of any data, for example, the encoding and decoding of text files.

Further, the parallel processing apparatus according to the present invention is not limited to the encoding and the decoding as mentioned above. It is possible to apply this parallel processing apparatus, regardless of the content of the data and the content of the data processing, when, in carrying out any data processing, the data to be processed is comprised of a predetermined set of data which can be used as a unit of parallel processing for data processing and the data forming the unit of parallel processing can be easily extracted from the original data to be processed.

Summarizing the advantageous effects of the invention, as explained above, according to the coding apparatus and the decoding apparatus of the present invention, for example, when carrying out the encoding and the decoding of image data, the load can be equally and efficiently distributed among a plurality of processing apparatuses. Further, the processing in each processing apparatus can be carried out without requiring any synchronization, therefore there is no idling time of the processing apparatuses for securing synchronization. As a result, such encoding and decoding can be carried out at a high speed.

Further, since all of the processing apparatuses have the same function and there is no need at all for synchronization and data communication among processing apparatuses, each processing apparatus or the control program thereof can be greatly simplified and, consequently, the configuration of the coding apparatus and the decoding apparatus per se can be simplified.

Further, according to the coding method and the decoding method of the present invention, when carrying out the encoding and the decoding of for example image data by parallel processing using a plurality of processing apparatuses, the load can be equally and efficiently distributed among the processing apparatuses. Further, the processings for the encoding and decoding can be distributed among the processing apparatuses so that the processing can be carried out without requiring synchronization among processing apparatuses. As a result, such encoding and decoding can be carried out at a high speed.

Further, the encoding method and the decoding method of the present invention are scalable methods in which the method of distribution of the load does not depend upon the number of the processing apparatuses or other aspects of the configuration of the parallel processing apparatuses, therefore can be applied to parallel processing apparatuses having various configurations.

What is claimed is:

1. A coding apparatus which carries out encoding of different encoding times depending on the content of the element data when encoding for each predetermined number of element data, comprising:

a dividing means for dividing the data to be encoded having a series of a plurality of element data into a plurality of partial data each having a predetermined number of element data;

a plurality of encoding means for encoding the predetermined number of element data of the divided partial data to generate encoded data of a predetermined data length; and distributing means for distributing the plurality of divided partial data among the plurality of encoding means and sequentially distributing next partial data to encoding means finishing the encoding of the distributed partial data.

2. A coding apparatus as set forth in claim 1, wherein said distributing means has a blocking means for dividing the image data into a plurality of macroblocks each having a predetermined number of image data and a partial data forming means for selecting a predetermined number of macroblocks from the divided plurality of macroblocks to form a plurality of partial data each having the predetermined number of macroblocks and each of said plurality of encoding means carries out the encoding for each of the macroblocks of the partial data to generate encoded data of a predetermined data length for each of the partial data.

3. A coding apparatus as set forth in claim 2, wherein each of said plurality of encoding means has a first encoding means for encoding by a predetermined system the image data contained in the macroblock for each macroblock of the distributed partial data, a second encoding means for quantizing the encoded image data of each macroblock and subjecting the quantized image data of each macroblock to variable length coding, and an encoded data generating means for introducing the variable length coded data of the predetermined number of macroblocks of the partial data into each partial data to generate encoded data of the predetermined data length.

4. A coding apparatus as set forth in claim 3, wherein said first encoding means of each of said plurality of encoding means carries out processing including orthogonal transform encoding including any of discrete cosine transform (DCT), Fourier transform, Hadamard transform, and K-L transform.

5. A coding apparatus as set forth in claim 3, wherein said second encoding means of each of said plurality of encoding means carries out the quantization and the variable length coding so that the data length of the variable length coded data of the predetermined number of macroblocks of the partial data becomes within the predetermined data length of the encoded data generated in the encoded data generating means.

6. A coding apparatus as set forth in claim 5, wherein said encoded data generating means has an encoded data block generating means for generating the same number of encoded data blocks as the macroblocks using as encoded data blocks the variable length coded data of each of the predetermined number of macroblocks of the partial data and a data moving means for moving the data of an encoded data block to other encoded data blocks so that the data length of the encoded data block becomes within the predetermined data length when the data length of the encoded data block generated exceeds the predetermined data length and generates encoded data comprised of the same number of encoded data blocks of the predetermined data length as the macroblocks.

7. A coding method which carries out encoding of different encoding times depending on the content of the element data when encoding for each predetermined number of element data, comprising the steps of:

dividing the data to be encoded having a series of a plurality of element data into a plurality of blocks each having a predetermined number of element data;

selecting any predetermined number of blocks from the plurality of divided blocks to form a plurality of partial data having the predetermined number of blocks;

sequentially distributing the plurality of formed partial data among a plurality of encoding means;

encoding by a predetermined system in each of said plurality of encoding means the element data included in the blocks for each block of partial data distributed to generate encoded data of a predetermined data length for each partial data;

further sequentially distributing next partial data to said encoding means finishing the processing on the partial data distributed; and sequentially encoding the plurality of partial data by said plurality of encoding means to generate encoded data of a predetermined data length.

8. A decoding apparatus which decodes encoded data comprised of encoded partial data, comprised of a predetermined number of element data encoded to a predetermined data length, by decoding with different decoding times in accordance with the content of the encoded data, the decoding apparatus comprising:

a distributing means for distributing a plurality of the encoded partial data to be decoded to a plurality of decoding means and further sequentially distributing the next encoded partial data to said decoding means finishing the decoding of the distributed encoded partial data;

said plurality of decoding means for decoding the distributed encoded partial data to restore the partial data having the predetermined number of element data; and a connecting means for arranging the plurality of element data of the partial data decoded by said plurality of decoding means in a desired order to restore the encoded data.

9. A decoding apparatus as set forth in claim 8, wherein said apparatus decodes encoded data obtained by predetermined encoding including transform encoding and variable length coding for each macroblock having a predetermined number of image data and generating encoded partial data of a predetermined data length from the encoded data of a predetermined number of macroblocks and each of said plurality of decoding means has:

a data extracting means for extracting the variable length coded data part from the encoded partial data, a variable length decoding means for carrying out variable length decoding on the extracted data, an inverse quantizing means for inversely quantizing the variable length decoded data, and an inverse transform means for carrying out an inverse transform of the transform encoding at the time of the encoding on the inversely quantized data.

10. A decoding apparatus as set forth in claim 9, wherein said inverse transform means of each of said plurality of decoding means carries out inverse transform processing of orthogonal transform encoding including any of discrete cosine transform (DCT), Fourier transform, Hadamard transform, and K-L transform.

11. A decoding apparatus as set forth in claim 9, wherein said encoded data is data having the same number of encoded data blocks of predetermined data lengths as the macroblocks contained in the partial data and has encoded data corresponding to the plurality of macroblocks contained suitably moved among the plurality of encoded data blocks and said data extracting means of each of said plurality of decoding means moves the data of the plurality of encoded data blocks so that the encoded data corresponding to the same macroblock are arranged continuously to extract the encoded data corresponding to the macroblocks.

12. A decoding method which decodes encoded data comprised of encoded partial data, comprised of a predetermined number of element data encoded to a predetermined data length, by decoding with different decoding times in accordance with the content of the encoded data, comprising:

distributing a plurality of the encoded partial data to be decoded to a plurality of decoding means;

decoding the distributed encoded partial data in said plurality of decoding means to restore the partial data having the predetermined number of element data;

sequentially distributing the next encoded partial data to said decoding means finishing the decoding of the distributed encoded partial data; and arranging the plurality of element data of the partial data decoded by said plurality of decoding means in a desired order to restore the encoded data.

* * * * *